US 8,725,625 B2

(12) United States Patent
Anderson et al.

(10) Patent No.: US 8,725,625 B2
(45) Date of Patent: May 13, 2014

(54) CAPITAL ASSET PLANNING SYSTEM

(71) Applicants: The Trustees of Columbia University in the City of New York, New York, NY (US); Consolidated Edison Energy Company of New York, New York, NY (US)

(72) Inventors: Roger N. Anderson, New York, NY (US); Maggie Chow, Hartsdale, NY (US); Albert Boulanger, New York, NY (US)

(73) Assignees: The Trustees of Columbia University in the City of New York, New York, NY (US); Consolidated Edison Energy Company of New York, New York, NY (US)

( * ) Notice: Subject to any disclaimer, the term of this patent is extended or adjusted under 35 U.S.C. 154(b) by 0 days.

(21) Appl. No.: 13/646,939

(22) Filed: Oct. 8, 2012

(65) Prior Publication Data
US 2013/0080205 A1 Mar. 28, 2013

Related U.S. Application Data

(63) Continuation-in-part of application No. 12/791,363, filed on Jun. 1, 2010, now abandoned, and a continuation-in-part of application No. 13/479,198, filed on May 23, 2012, which is a continuation of application No. 13/274,770, filed on Oct. 17, 2011, now abandoned, and a continuation of application No. PCT/US2010/036717, filed on May 28, 2010.

(60) Provisional application No. 61/182,085, filed on May 28, 2009.

(51) Int. Cl.
*G06Q 40/00* (2012.01)

(52) U.S. Cl.
USPC ............ 705/37; 705/36 R; 705/7.28; 705/28; 705/14.66; 700/286

(58) Field of Classification Search
None
See application file for complete search history.

(56) References Cited

U.S. PATENT DOCUMENTS 5,225,712 A 7/1993 Erdman
5,625,751 A 4/1997 Brandwajn et al.
(Continued)

FOREIGN PATENT DOCUMENTS

EP 2 377 217 10/2011
WO WO 93/03401 2/1993
(Continued)

OTHER PUBLICATIONS

Dutta, Haimonti, et al. "Estimating the Time Between Failures of Electrical Feeders in the New York Power Grid." Next Generation Data Mining Summit, NGDM (2009).*

(Continued)

*Primary Examiner* — Gurkanwaljit Singh
(74) *Attorney, Agent, or Firm* — Baker Botts, L.L.P.

(57) ABSTRACT

A capital asset planning system for selecting assets for improvement within an infrastructure that includes one or more data sources descriptive of the infrastructure, one or more databases, coupled to the one or more data sources, to compile the one or more data sources, one or more processors, each coupled to and having respective communication interfaces to receive data from the one or more databases. The processor includes a predictor to generate a first metric of estimated infrastructure effectiveness based, at least in part, on a current status of the infrastructure, a second metric of estimated infrastructure effectiveness based, at least in part, on a user-selected, proposed changed configuration of the infrastructure, and a net metric of infrastructure effectiveness based, at least in part, on said first metric and said second metric. The system also includes a display, coupled to have the one or more processors, for visually presenting the net metric of infrastructure effectiveness, in which the assets for improvement are selected based, at least in part, on the net metric of infrastructure effectiveness.

26 Claims, 26 Drawing Sheets

(56) References Cited

U.S. PATENT DOCUMENTS

| | | | |
|---|---|---|---|
| 5,764,155 A | 6/1998 | Kertesz et al. | |
| 5,862,391 A | 1/1999 | Salas et al. | |
| 5,875,431 A | 2/1999 | Heckman et al. | |
| 5,893,069 A | 4/1999 | White et al. | |
| 5,959,547 A | 9/1999 | Tubel et al. | |
| 5,963,457 A | 10/1999 | Kanoi et al. | |
| 6,012,016 A | 1/2000 | Bilden et al. | |
| 6,055,517 A * | 4/2000 | Friend et al. | 705/36 R |
| 6,125,044 A | 9/2000 | Cherniski et al. | |
| 6,125,453 A | 9/2000 | Wyss | |
| 6,154,731 A | 11/2000 | Monks et al. | |
| 6,169,981 B1 | 1/2001 | Werbos | |
| 6,219,650 B1 * | 4/2001 | Friend et al. | 705/36 R |
| 6,266,619 B1 | 7/2001 | Thomas et al. | |
| 6,308,162 B1 | 10/2001 | Ouimet et al. | |
| 6,311,144 B1 | 10/2001 | Abu El Ata | |
| 6,321,205 B1 | 11/2001 | Eder | |
| 6,434,435 B1 | 8/2002 | Tubel et al. | |
| 6,512,966 B2 * | 1/2003 | Lof et al. | 700/291 |
| 6,519,568 B1 | 2/2003 | Harvey et al. | |
| 6,581,045 B1 * | 6/2003 | Watson | 705/400 |
| 6,629,044 B1 | 9/2003 | Papallo, Jr. et al. | |
| 6,772,211 B2 | 8/2004 | Lu et al. | |
| 6,807,537 B1 | 10/2004 | Thiesson et al. | |
| 6,826,483 B1 | 11/2004 | Anderson et al. | |
| 6,829,384 B2 | 12/2004 | Schneiderman et al. | |
| 6,944,678 B2 | 9/2005 | Lu et al. | |
| 6,963,793 B2 | 11/2005 | Yamada et al. | |
| 7,106,045 B2 | 9/2006 | Jungwirth et al. | |
| 7,127,584 B1 | 10/2006 | Thompson et al. | |
| 7,130,832 B2 | 10/2006 | Bannai et al. | |
| 7,132,623 B2 | 11/2006 | De Miranda et al. | |
| 7,233,843 B2 | 6/2007 | Budhraja et al. | |
| 7,236,953 B1 | 6/2007 | Cooper et al. | |
| 7,243,081 B2 * | 7/2007 | Friend et al. | 705/36 R |
| 7,274,975 B2 | 9/2007 | Miller | |
| 7,369,950 B2 | 5/2008 | Wall et al. | |
| 7,395,252 B2 | 7/2008 | Anderson et al. | |
| 7,464,119 B1 | 12/2008 | Akram et al. | |
| 7,519,506 B2 | 4/2009 | Trias | |
| 7,555,454 B2 | 6/2009 | Cooper et al. | |
| 7,590,472 B2 | 9/2009 | Hakim et al. | |
| 7,653,449 B2 * | 1/2010 | Hunter et al. | 700/99 |
| 7,873,567 B2 | 1/2011 | Eder | |
| 7,925,557 B1 * | 4/2011 | Ficery et al. | 705/35 |
| 7,945,524 B2 | 5/2011 | Anderson et al. | |
| 8,036,996 B2 | 10/2011 | Long et al. | |
| 8,116,915 B2 * | 2/2012 | Kempton | 700/291 |
| 8,305,737 B2 | 11/2012 | Ewing et al. | |
| 2001/0049651 A1 | 12/2001 | Selleck | |
| 2002/0001307 A1 | 1/2002 | Nguyen et al. | |
| 2002/0084655 A1 | 7/2002 | Lof et al. | |
| 2002/0087234 A1 * | 7/2002 | Lof et al. | 700/286 |
| 2002/0198627 A1 | 12/2002 | Nasman et al. | |
| 2003/0130755 A1 | 7/2003 | Bazzocchi et al. | |
| 2003/0171851 A1 | 9/2003 | Brickfield et al. | |
| 2003/0188208 A1 | 10/2003 | Fung | |
| 2004/0143477 A1 | 7/2004 | Wolff | |
| 2004/0158417 A1 | 8/2004 | Bonet | |
| 2004/0158772 A1 | 8/2004 | Pan et al. | |
| 2004/0163895 A1 | 8/2004 | Kostka et al. | |
| 2004/0267395 A1 | 12/2004 | Discenzo et al. | |
| 2005/0033707 A1 | 2/2005 | Ehlers et al. | |
| 2005/0034023 A1 | 2/2005 | Maturana et al. | |
| 2005/0207081 A1 | 9/2005 | Ying | |
| 2006/0106797 A1 | 5/2006 | Srinivasa et al. | |
| 2006/0168398 A1 | 7/2006 | Cadaret | |
| 2006/0185756 A1 | 8/2006 | Sato et al. | |
| 2006/0200400 A1 * | 9/2006 | Hunter et al. | 705/36 R |
| 2006/0259199 A1 | 11/2006 | Gjerde et al. | |
| 2006/0288260 A1 | 12/2006 | Xiao et al. | |
| 2007/0094187 A1 | 4/2007 | Anderson et al. | |
| 2007/0177508 A1 | 8/2007 | Croak et al. | |
| 2007/0192078 A1 | 8/2007 | Nasle et al. | |
| 2007/0198108 A1 | 8/2007 | Nair et al. | |
| 2007/0228843 A1 | 10/2007 | Radley | |
| 2007/0271006 A1 | 11/2007 | Golden et al. | |
| 2008/0039980 A1 | 2/2008 | Pollack et al. | |
| 2008/0109205 A1 | 5/2008 | Nasle | |
| 2008/0126171 A1 | 5/2008 | Baldwin et al. | |
| 2008/0167756 A1 | 7/2008 | Golden et al. | |
| 2008/0177678 A1 | 7/2008 | Di Martini et al. | |
| 2008/0183339 A1 | 7/2008 | Vaswani et al. | |
| 2008/0250265 A1 | 10/2008 | Chang et al. | |
| 2008/0281663 A1 | 11/2008 | Hakim et al. | |
| 2008/0294387 A1 | 11/2008 | Anderson et al. | |
| 2008/0313006 A1 | 12/2008 | Witter et al. | |
| 2008/0319923 A1 | 12/2008 | Casey et al. | |
| 2009/0031241 A1 | 1/2009 | Castelli et al. | |
| 2009/0063094 A1 * | 3/2009 | Havener et al. | 702/179 |
| 2009/0063122 A1 | 3/2009 | Nasle | |
| 2009/0076749 A1 | 3/2009 | Nasle | |
| 2009/0113049 A1 | 4/2009 | Nasle et al. | |
| 2009/0157573 A1 | 6/2009 | Anderson et al. | |
| 2009/0178089 A1 * | 7/2009 | Picco et al. | 725/87 |
| 2009/0187285 A1 | 7/2009 | Yaney et al. | |
| 2009/0240380 A1 | 9/2009 | Shah et al. | |
| 2010/0106641 A1 * | 4/2010 | Chassin et al. | 705/40 |
| 2010/0107173 A1 * | 4/2010 | Chassin | 718/104 |
| 2010/0114387 A1 * | 5/2010 | Chassin | 700/286 |
| 2010/0169226 A1 * | 7/2010 | Lymbery et al. | 705/80 |
| 2010/0185557 A1 * | 7/2010 | Hunter et al. | 705/36 R |
| 2010/0207728 A1 | 8/2010 | Roscoe et al. | |
| 2010/0306014 A1 | 12/2010 | Chow | |
| 2010/0332373 A1 * | 12/2010 | Crabtree et al. | 705/37 |
| 2011/0175750 A1 | 7/2011 | Anderson et al. | |
| 2011/0231213 A1 | 9/2011 | Anderson et al. | |
| 2011/0264276 A1 | 10/2011 | Kressner et al. | |
| 2011/0282703 A1 | 11/2011 | Chow et al. | |
| 2012/0029677 A1 * | 2/2012 | Havener et al. | 700/103 |
| 2012/0072039 A1 | 3/2012 | Anderson et al. | |
| 2012/0146799 A1 | 6/2012 | Bell et al. | |
| 2012/0197558 A1 | 8/2012 | Henig et al. | |
| 2012/0200423 A1 | 8/2012 | DiLuciano et al. | |
| 2013/0232094 A1 | 9/2013 | Anderson et al. | |

FOREIGN PATENT DOCUMENTS

| | | |
|---|---|---|
| WO | WO 2007/087537 | 2/2007 |
| WO | WO 2007/136456 | 11/2007 |

OTHER PUBLICATIONS

Chambal, Stephen Paul (1999). Advancing reliability, maintainability, and availability analysis through a robust simulation environment. Ph.D. dissertation, Arizona State University, United States.*

Chen, Y.. Performance and control of parallel multi-server queues with applications to web hosting services. Ph.D. dissertation, The Pennsylvania State University, United States.*

Amoedo, Maria Mercedes (2005). A structured methodology for identifying performance metrics and monitoring maintenance effectiveness. M.S. dissertation, University of Maryland, College Park, United States.*

Javad Barabady, & Uday Kumar. (2007). Availability allocation through importance measures. The International Journal of Quality & Reliability Management, 24(6), 643-657.*

Naidu, S., Amalesh, J., Rao, P., & Sawhney, R.. (Jan. 1). An Empirical Model for Maintenance Strategy Selection based on Organizational Profit. IIE Annual Conference. Proceedings,1765-1770.*

Chen, C.. Distributed multi-modal human activity analysis: From algorithms to systems. Ph.D. dissertation, Princeton University, United States—New Jersey. Retrieved Mar. 25, 2012.*

Hobbs, Benjamin "Optimization methods for electric utility resource planning" European Journal of Operational Research; pp. 1-20; May 18, 1995.*

Ralph L. Keeney et al., "Evaluating Improvements in Electric Utility Reliability at British Columbia Hydro" Operations Research Nov./Dec. 1995 vol. 43 No. 6 933-947.*

U.S. Appl. No. 12/885,800, Feb. 21, 2013, Final Office Action.

International Search Report and Written Opinion for PCT/US2012/056321, dated Dec. 7, 2012.

(56) References Cited

OTHER PUBLICATIONS

Doukas, et al., "Intelligent Building Energy Management System Using Rule Sets", *Building and Environment*, 42:3562-3569 (2007) [online]. Retrieved Oct. 29, 2012 from URL:<http://www.aseanbiotechnology.info/Abstract/21024252.pdf>.
Ma, "Online Supervisory and Optimal Control of Complex Building Central Chilling Systems", [online], dated Apr. 2008. Retrieved on Oct. 29, 2012 from URL:<http://repository.lib.polyu.edu.hk/jspui/bitstream/10397/3415/2/b2239753x_ir.pdf.
Martin, "Optimal Prediction, Alarm, and Control in Buildings Using thermal Sensation Complaints", [online] Fall 2004. Retrieved on Oct. 29, 2012 from URL:<http://ti.arc.nasa.gov/m/pub-archive/archive/PhDThesis.pdf>.
Trcica, "Co-Simulation for Performance Prediction of Innovative Intergated mechanical Energy Systems in Buildings", [online] Oct. 8, 2008. Retrieved on Oct. 29, 2012 from URL:<http://www.bwk.tue.nl/bps/hensen/team/past/Trcka.pdf>.
U.S. Appl. No. 13/274,770, filed Oct. 17, 2011, (Abandoned).
U.S. Appl. No. 13/274,770, filed Jul. 23, 2008, (Abandoned).
U.S. Appl. No. 13/479,198, filed May 23, 2012.
U.S. Appl. No. 13/589,737, filed Aug. 20, 2012.
U.S. Appl. No. 13/589,916, filed Aug. 20, 2012.
U.S. Appl. No. 13/274,770, Jun. 8, 2012, Notice of Abandonment.
U.S. Appl. No. 12/019,347, Nov. 17, 2011, Advisory Action.
U.S. Appl. No. 12/019,347, Oct. 24, 2011, Amendment and Request for Continued Examination (RCE).
U.S. Appl. No. 12/019,347, Jul. 25, 2011, Final Office Action.
U.S. Appl. No. 12/019,347, Jun. 8, 2011, Response to Non-Final Office Action.
U.S. Appl. No. 11/349,711, Mar. 13, 2008, Issue Fee payment.
U.S. Appl. No. 11/349,711, Feb. 22, 2008, Notice of Allowance.
U.S. Appl. No. 11/349,711, Dec. 14, 2007, Response to Non-Final Office Action.
U.S. Appl. No. 11/349,711, Aug. 17, 2007, Non-Final Office Action.
U.S. Appl. No. 12/045,458, Sep. 6, 2011, Issue Fee payment.
U.S. Appl. No. 12/045,458, Jun. 3, 2011, Notice of Allowance.
U.S. Appl. No. 12/045,458, May 10, 2011, Response to Non-Final Office Action.
U.S. Appl. No. 12/045,458, Jan. 10, 2011, Non-Final Office Action.
U.S. Appl. No. 12/045,458, Oct. 28, 2010, Response to Non-Final Office Action.
U.S. Appl. No. 12/045,458, Apr. 30, 2010, Non-Final Office Action.
U.S. Appl. No. 12/178,553, Apr. 5, 2011, Issue Fee payment.
U.S. Appl. No. 12/178,553, Jan. 7, 2011, Notice of Allowance.
U.S. Appl. No. 12/178,553, Dec. 2, 2010, Response to Non-Final Office Action.
U.S. Appl. No. 12/178,553, Jun. 4, 2010, Non-Final Office Action.
U.S. Appl. No. 12/885,800, Nov. 6, 2012, Response to Non-Final Office Action.
U.S. Appl. No. 12/885,800, Jul. 9, 2012, Non-Final Office Action.
Shervais, "Adaptive Critic Based Adaptation of a Fuzzy Policy Manager for a Logistic System", *IEEE*, 0-7803-7078, pp. 568-573 (2001).
Begg et al,, "The Value of Flexibility in Managing Uncertainty in Oil and Gas Investments", *SPE 77586*, pp. 1-10 (2002).
Saputelli et al., "Real-time Reservoir Management: A multiscale adaptive optimization and control approach", [Online] Downloaded Nov. 29, 2010. *Computational Geosciences Springer 2006*, http://www.springerlink.com/content/4175n8841743684v/fulltext.pdf; vol. 10: 61-96.
Long et al., "Martingale Boosting", *COLT 2005, LNAI 3559*, pp. 79-94 (Jun. 2005).
Auer et al., Learning Theory, 18th Annual Conference on Learning Theory, COLT 2005, Bertinoro, Italy, Jun. 27-30, 2005, Proceedings. *Lecture Notes in Computer Science*, 3559.
Kong et al., "Web-based monitoring of real-time ECG data", *Computers in Cardiology*, 27: 189-192 (2000).
Hanley, et al., "The meaning and use of the area under a receiver operating characteristic (ROC) curve", *Radiology*, 143: 29-36 (Apr. 1982).

Zdrallek, "Reliability centered maintenance strategy for high voltage networks", *8th International Conference on Probabilistic Methods Applied to Power Systems*, pp. 332-337 (Sep. 2004).
Gross, et al., "Predicting electricity distribution feeder failures using machine learning susceptibility analysis", *AAAI, Proceedings of the 18th Conference on Innovative Applications of Artificial Intelligence*, pp. 1705-1711 (2006).
Warwick, et al., Shortened version of chapter 6 of the book "Artificial intelligence techniques in power systems", *IEE Power Engineering Series 22*, pp. 109-122 (1997).
Venayagamoorthy, et al., "Experimental studies with continually online trained artificial neural networks identifiers for multiple turbogenerators on the electric power grid", 2001, *IEEE*, 0-7803-7044, pp. 1267-1272.
Rajan, "Demand Side Management Using Expert Systems: 2003, TENCON 2003,Conference on Convergent Technologies for Asia-Pacific Region" *IEEE*, 0-7803-7651. (2003).
Rudin et al., "Predicting Vulnerability to Serious Manhole Events in Manhattan: A Preliminary Machine Learning Approach", Submitted for Journal, Dec. 2008, Retrieved online on Nov. 29, 2011 at : <http://wwwl.ccls.columbia.edu--rudin/RudinEtAI2008_ManholeEvents.pdf>, Entire Document.
Barry et al., "Applications of Learning Classifier Systems, Data Mining using Learning Classifier Systems", Springer, May 27, 2004, pp. 15-67, Retrieved online Nov. 29, 2011 at : <http://books.google.com/books?id=aBljqGag5kC&lr=&source=gbs_navlinks_s>.
Bickel, et al., "Semiparametric Inference and Model", Sep. 5, 2005 [retrieved on Jul. 23, 2012] Retrieved from the internee: URL:http://www.stat.washington.edu/jaw/JAW-papers/NR/jaw-BKR-EncylSS.pdf entire document.
Liu, et al., "Weighted Nonparametric Maximum Likelihood Estimate of a Mixing Distribution in Nonrandomized Clinical Trials", Feb. 20, 2006 [retrieved on Jul. 23, 2012] Retrieved from Internet: URL:HTTP://www.stat.purdue.edu/~junxie/Papers/weightedSBR.pdf> entire document.
Cameron, "Microeconometrics: Methods and Applications", *Cambridge University Press*, p. 333 (2005).
Bhatt, "The Application of Power Quality Monitoring Data for Reliability Centered Maintenance" EPRI (Electric Power Research Institute, Inc.) 152 pages (2000).
International Search Report for PCT/US2004/28185, dated Feb. 11, 2005.
International Search Report for PCT/US2010/024955, dated Apr. 23, 2010.
International Search Report for PCT/US2010/036717, dated Jul. 28, 2010.
International Search Report and Written Opinion for PCT/US2009/037996, dated May 19, 2009.
International Search Report and Written Opinion for PCT/US2009/037995, dated Mar. 23, 2009.
International Search Report and Written Opinion for PCT/US2011/044389, dated Dec. 14, 2011.
International Search Report and Written Opinion for PCT/US2012/050439, dated Oct. 22, 2012.
International Search Report and Written Opinion for PCT/US2012/033309, dated Aug. 1, 2012.
Amoedo, "A Structured Methodology for Identifying Performance Metrics and Monitoring Maintenance Effectiveness", *M.S. Dissertation*, University of Maryland, College Park, United States, (2005).
Barabady, et al. "Availability Allocation Through Importance Measures", *The International Journal of Quality & Reliability Management*, 24(6):643-657 (2007).
Chen, "Distributed Multi-Modal Human Activity Analysis: From Algorithms to Systems", *Ph.D. dissertation*, Princeton University, United States, New Jersey, (Retrieved Mar. 25, 2012).
Hobbs, "Optimization Methods for Electric Utility Resource Planning", *European Journal of Operational Research*, pp. 1-20 (May 18, 1995).
Keeney, et al., "Evaluating Improvements in electricity Utility Reliability at British Columbia Hydro", *Operations Research*, 43(6):933-947 (Nov./Dec. 1995).

(56) References Cited

OTHER PUBLICATIONS

Naidu, et al., "An Empirical Model for Maintenance Strategy Selection Based on Organization Profit", *Proceedings of the 2009 Industrial Engineering Research Conference*, pp. 1765-1770 (Jan. 2009).
Chambal, "Advancing Reliability, Maintability, and Availability Analysis Through a Robust Simulation Environment", *Ph.D. Dissertation*, Arizona State University, United States (1999).
Chen, "Performance and Control of Parallel Multi-Server Queues with Applications to Web Hosting Services", *Ph.D. Dissertation*, The Pennsylvania state University, United States (2006).
U.S. Appl. No. 12/909,022, Aug. 15, 2013, Final Office Action.
U.S. Appl. No. 12/909,022, Aug. 6, 2013, Response to Non-Final Office Action.
U.S. Appl. No. 12/019,347, Sep. 11, 2013, Issue Fee payment.
U.S. Appl. No. 13/742,124, Sep. 20, 2013, Non-Final Office Action.
Chen, et al., "Particle Swarm Optimization for Next Generation Smart Grid Outage Analyses", IEEE Transmission and Distribution Conference and Exposition, pp. 1-6.
Choi, et al., "The Design of Outage Management System Utilizing Meter Information Based on AMI (Advanced Metering Infrastructure) system", *IEEE, 8th International Conference on Power Electronics—ECCE Asia*, pp. 2955-2961 (May 30-Jun. 30, 2011).
Lundgren, Implementing Service Model Visualizations: Utilizing Hyperbolic Tree Structures for Visualizing Service Models in Telecommunication Networks:, *Institutionen for Informatik*, 30 pages (2009).
Russell, et al., "Intelligent Systems for Improved Reliability and Failure Diagnosis in Distribution Systems", *IEEE Transactions on Smart Grid*, 1(1):48-56 (2010).
Zhu, et al., "Lassoing Line Outages on the Smart Power Grid", *IEEE International Conference of Smart Grid Communications*, pp. 570-575 (2011).
U.S. Appl. No. 12/885,800, Jul. 18, 2013 Amendment and Request for Continued Examination (RCE).
U.S. Appl. No. 13/589,737, Oct. 2, 2013 Final Office Action.
U.S. Appl. No. 13/589,737, Aug. 29, 2013 Response to Non-Final Office Action.
U.S. Appl. No. 13/214,057, Jan. 2, 2014 Non-Final Office Action.
U.S. Appl. No. 13/589,737, Dec. 27, 2013 Amendment and Request for Continued Examination (RCE).
U.S. Appl. No. 13/742,124, Dec. 20, 2013 Response to Non-Final Office Action.

\* cited by examiner

Capital Asset Prioritization Tool (CAPT)

| Benefits & Cost | Network Cost | LPW | Charts ↓ |

Feeder:4X52

CAPT Feeder Section Change Aid
PILC MTBF Calculation

For Target Percentage: 75   achieved percentage: 72   Selected Strategy: Replace PILC % Rank

- Intro
- Load Relief Section Selection
- Load Relief MTBF Calculation
- PILC Section Replacement Selection

PILC MTBF Calculation
- Reliability – Replace Stop Joints
- Reliability MTBF – Replace Stop Joints
- Reliability – Replace XLP
- Reliability MTBF – Replace XLP

LPW Selection
- LPW MTBF Calculation
- Reliability – Replace Elastimold 2W/1W Stop
- Reliability MTBF – Replace Elastimold 2W/1W Sections Changed: 46
Load Tier:
Load Strategy: 100

|  | Base | New | Change |
|---|---|---|---|
| Rank | 181 | 233 | 52 |
| Est MTBF (days) | 310 | 343 | 34 |
| Est. FOT | 4 | 4 | 0 |

Calculate New MTBF   Prev   Next

Sections Changed Detail:
| | | |
|---|---|---|
| 04X52 | M13127 | M13133 |
| 04X52 | M26 | M27 |
| 04X52 | M32947 | M32949 |
| 04X52 | M13125 | M13127 |
| 04X52 | M32949 | M32948 |

80 — Change Summary: 4X52
Total Sections Changed: 56
90 — Cost/Section: 18000
All Tier Total: 1008000

From FIG.1A

Other Feeder Stats: 4X52

| | |
|---|---|
| Last OA Date | 8/20/2008 12:39:55 AM |
| Days since Last OA | 638 |
| Last Sch Wk Date | 10/31/2008 5:03:00 PM |
| Last Succ HiPot Date: | 12/6/2007 3:19:37AM |

[Click For Feeder OA Chart]

| | | |
|---|---|---|
| Actual MTBF ~30 | 358 | |
| OA CNT (since 2000) ~40 | 7 | |
| CIOA CNT (since 2000) | 0 | |
| ALL Outage CNT (since 2000) | 41 | |

Feeder Attributes

Cable Sections:

| | Base ~10 | | New ~20 | |
|---|---|---|---|---|
| | Count | Percent | Count | Percent |
| Paper >= 40 years | 54 | 29.8 | 16 | 8.83 |
| Paper < 40 Years | 13 | 7.18 | 5 | 2.76 |
| Solid < 16 Years | 76 | 41.9 | 124 | 68.5 |
| Solid > 16 Years (except 1970-1975) | 38 | 20.9 | 36 | 19.9 |
| Solid Betwn 1970 & 1975 | 0 | 0.00 | 0 | 0 |
| Total Sections | 181 | | 181 | |

Joints:

| | Base | | New | |
|---|---|---|---|---|
| | Count | Percent | Count | Percent |
| Elastimold 2W-1W Stop > 1993 | 0 | 0.00 | 0 | 0 |
| Elastimold 2W-1W Stop <= 1993 | 0 | 0.00 | 0 | 0 |
| Raychem 3W-1W Stop > 1993 | 23 | 14.9 | 7 | 5 |

Transformers:

| | Base | | New | |
|---|---|---|---|---|
| | Count | Percent | Count | Percent |
| Non Westinghouse XFMR > 40 years | 1 | 3.85 | 1 | 3.85 |
| Non Westinghouse XFMR Betwn 30 & 39 years | 1 | 3.85 | 1 | 3.85 |
| Non Westinghouse XFMR Betwn 20 & 29 years | 1 | 3.85 | 1 | 3.85 |
| Non Westinghouse XFMR Betwn 10 & 19 years | 7 | 26.9 | 7 | 26.9 |
| Non Westinghouse XFMR Betwn 0 & 9 years | 15 | 57.6 | 15 | 57.6 |
| Westinghouse XFMR > 40 years | 0 | 0.00 | 0 | 0.00 |
| Westinghouse XFMR Betwn 30 & 39 years | 0 | 0.00 | 0 | 0.00 |
| Westinghouse XFMR Betwn 20 & 29 years | 0 | 0.00 | 0 | 0.00 |

FIG.1B

Capital Asset Prioritization Tool (CAPT)

| Benefits & Cost | Network Cost | LPW | Charts ▼ |
|---|---|---|---|

Feeder: 4X40

Intro
- Load Relief Section Selection
- Load Relief MTBF Calculation
- PILC Section Replacement Selection
- PILC MTBF Calculation
- Reliability – Replace Stop Joints
- Reliability MTBF – Replace Stop Joints
- Reliability – Replace XLP
- Reliability MTBF – Replace XLP
- LPW Selection
- LPW MTBF Calculation
- Reliability – Replace Elastimold 2W/1W Stop
- Reliability MTBF – Replace Elastimold 2W/1W ⊞ CAPT Feeder Section Change Aid Introduction The next set of steps will help you calculate the costs and benefits of replacing cable sections (and joints) for Load Relief, PILC Replacement, and Reliability goals. First select the feeder of interest below Select Borough: Bronx        Feeder maps
Select Network: Central Bronx (4X)   Feeder maps
Criteria: All
Percentage >= 100
Select Feeder: 4X40         Feeder maps Feeder Selection

[Start]

720
710
700

Sections Changed Detail:
| 04X40 | M16205 | M16210 |
| 04X40 | M16160 | M16164 |
| 04X40 | M16191 | M16194 |
| 04X40 | M23077 | M25916 |
| 04X40 | CM2_v2288 | |
| 04X40 | M13590 | M21002 |

Change Summary: 4X40
- Total Sections Changed: 20
- Cost/Section: 18000
- All Tier Total: 360000

730

740

Other Feeder Stats: 4X40
- Last OA Date: 2/18/2007 6:01:06 AM
- Days since Last OA: 1187
- Last Sch Wk Date: 8/22/2008 8:14:00 AM
- Last Succ HiPot Date: 1/21/2008 7:27:38 AM

- Actual MTBF
- OA CNT (since 2000): 413
- CIOA CNT (since 2000): 5
- ALL Outage CNT (since 2000): 0
- 31

[Click For Feeder OA Chart]

From FIG.5A

Feeder Attributes

Cable Sections:

| | Base Count | Base Percent | New Count | New Percent |
|---|---|---|---|---|
| Paper >= 40 years | 36 | 27.0 | 20 | 15.0 |
| Paper < 40 years | 9 | 6.77 | 5 | 3.75 |
| 760 — Solid < 16 Years | 55 | 41.3 | 75 | 56.4 |
| Solid > 16 Years (except 1970-1975) | 33 | 24.8 | 33 | 24.8 |
| Solid Betwn 1970 & 1975 | 0 | 0.00 | 0 | 0 |
| *Total Sections* | 133 | | 133 | |

Joints:

| | Base Count | Base Percent | New Count | New Percent |
|---|---|---|---|---|
| Elastimold 2W-1W Stop > 1993 | 0 | 0.00 | 0 | 0 |
| Elastimold 2W-1W Stop <= 1993 | 0 | 0.00 | 0 | 0 |
| Raychem 3W-1W Stop > 1993 | 13 | 10.5 | 8 | 7.20 |
| Raychem 3W-1W Stop <= 1993 | 11 | 9.17 | 5 | 4.50 |
| Other Stop Joints < 7 years | 5 | 4.17 | 3 | 2.70 |
| Other Stop Joints Betwn 7 & 12 years | 0 | 0.00 | 0 | 0 |
| Other Stop Joints > 12 years | 5 | 4.17 | 3 | 2.70 |
| 770 — *Stop Joint Total* | 34 | 28.2 | 19 | 17.1 |
| Paper Joints < 8 years | 0 | 0.00 | 0 | 0 |
| Paper Joints Betwn 8 & 16 years | 0 | 0.00 | 0 | 0 |
| Paper Joints Betwn 16 & 24 years | 0 | 0.00 | 0 | 0 |
| Paper Joints Betwn 24 & 32 years | 1 | 0.83 | 0 | 0 |
| Paper Joints Betwn 32 & 40 years | 10 | 8.33 | 5 | 4.50 |
| Paper Joints > 40 years | 17 | 14.1 | 12 | 10.8 |
| *Total Paper Joints* | 26 | 23.3 | 17 | 15.3 |

Transformers:

| | Base Count | Base Percent | New Count | New Percent |
|---|---|---|---|---|
| Non Westinghouse XFMR > 40 years | 1 | 4.55 | 1 | 4 |
| Non Westinghouse XFMR Betwn 30 & 39 years | 2 | 9.09 | 2 | 9 |
| Non Westinghouse XFMR Betwn 20 & 29 years | 0 | 0.00 | 0 | 0 |
| Non Westinghouse XFMR Betwn 10 & 19 years | 4 | 18.1 | 4 | 1 |
| Non Westinghouse XFMR Betwn 0 & 9 years | 14 | 63.6 | 14 | 6 |
| Westinghouse XFMR > 40 years | 1 | 4.55 | 1 | 4 |
| Westinghouse XFMR Betwn 30 & 39 years | 0 | 0.00 | 0 | 0 |
| Westinghouse XFMR Betwn 20 & 29 years | 0 | 0.00 | 0 | 0 |
| Westinghouse XFMR Betwn 10 & 19 years | 0 | 0.00 | 0 | 0 |
| Westinghouse XFMR Betwn 0 & 9 years | 0 | 0.00 | 0 | 0 |
| *Total XFMR* | 22 | | 22 | | — 780

Load: (Requires external programs: Jeopardy and PVL)

| | Base Count | Base Percent | New Count | New Percent |
|---|---|---|---|---|
| Feeder Load | 385 | | 385 | |
| Normal Feeder Rating | 490 | | 490 | |
| Emergency Feeder Rating | 755 | | 755 | |
| Emergency Feeder Load | 555 | | 555 | | — 790
| 4KV Feeder Count | 0 | | 0 | |
| Load Pocket Weight: Total and Avg for Feeder | 11 | 0.36 | 11 | |
| Feeder Importance to Jeopardy | 8.75 | | 8.75 | 0 |

| Feeder | From Str | To Str | Type | % Load | Load | Length | Installation Date | FeederMap Link |
|---|---|---|---|---|---|---|---|---|
| 04X52 | M13127 | M13133 | XLP | 115 | | | 9/23/1993 12:00:00 AM | Section on Feedermap |
| 04X52 | M26 | M27 | EPR | 107 | | | 5/2/2007 12:00:00 AM | Section on Feedermap |
| 04X52 | M32947 | M32949 | EPR | 107 | | | 5/2/2007 12:00:00 AM | Section on Feedermap |
| 04X52 | M13125 | M13127 | XLP | 115 | | | 9/23/1993 12:00:00 AM | Section on Feedermap |
| 04X52 | M32949 | M32948 | EPR | 107 | | | 5/2/2007 12:00:00 AM | Section on Feedermap |
| 04X52 | M24 | M25 | EPR | 107 | | | 5/2/2007 12:00:00 AM | Section on Feedermap |
| 04X52 | M32950 | M24 | EPR | 107 | | | 5/2/2007 12:00:00 AM | Section on Feedermap |
| 04X52 | M25 | M26 | EPR | 107 | | | 5/2/2007 12:00:00 AM | Section on Feedermap |
| 04X52 | M32948 | M32950 | EPR | 107 | | | 5/2/2007 12:00:00 AM | Section on Feedermap |
| 04X52 | M32936 | M32947 | EPR | 107 | | | 5/2/2007 12:00:00 AM | Section on Feedermap |

Continued on FIG.12B

From FIG.13A

Feeder Attributes

Cable Sections:

| | Base Count | Base Percent | New Count | New Percent |
|---|---|---|---|---|
| Paper >= 40 years | 45 | 19.9 | 0 | 0 |
| Paper < 40 years | 10 | 4.42 | 0 | 0 |
| Solid < 16 Years | 131 | 57.9 | 186 | 82.3 |
| Solid > 16 Years (except 1970–1975) | 34 | 15.0 | 34 | 15.0 |
| Solid Betwn 1970 & 1975 | 6 | 2.65 | 6 | 2.65 |
| *Total Sections* | 226 | | 226 | |

Joints:

| | Base Count | Base Percent | New Count | New Percent |
|---|---|---|---|---|
| Elastimold 2W-1W Stop > 1993 | 0 | 0.00 | 0 | 0 |
| Elastimold 2W-1W Stop <= 1993 | 0 | 0.00 | 0 | 0 |
| Raychem 3W-1W Stop > 1993 | 20 | 10.5 | 0 | 0 |
| Raychem 3W-1W Stop <= 1993 | 3 | 1.58 | 0 | 0 |
| Other Stop Joints < 7 years | 2 | 1.05 | 0 | 0 |
| Other Stop Joints Betwn 7 & 12 years | 3 | 1.58 | 0 | 0 |

Transformers:

| | Base Count | Base Percent | New Count | New Percent |
|---|---|---|---|---|
| Non Westinghouse XFMR > 40 years | 1 | 2.33 | 1 | 2.33 |
| Non Westinghouse XFMR Betwn 30 & 39 years | 3 | 6.98 | 3 | 6.98 |
| Non Westinghouse XFMR Betwn 20 & 29 years | 3 | 7.00 | 3 | 7.00 |
| Non Westinghouse XFMR Betwn 10 & 19 years | 14 | 32.5 | 14 | 32.5 |
| Non Westinghouse XFMR Betwn 0 & 9 years | 19 | 44.1 | 19 | 44.1 |
| Westinghouse XFMR > 40 years | 1 | 2.33 | 1 | 2.33 |
| Westinghouse XFMR Betwn 30 & 39 years | 1 | 2.33 | 1 | 2.33 |
| Westinghouse XFMR Betwn 20 & 29 years | 0 | 0.00 | 0 | 0.00 |
| Westinghouse XFMR Betwn 10 & 19 years | 1 | 2.33 | 1 | 2.33 |
| Westinghouse XFMR Betwn 0 & 9 years | 0 | 0.00 | 0 | 0.00 |
| *Total XFMR* | 43 | | 43 | |

FIG.13B

Feeder:3B92

| | |
|---|---|
| Intro | |
| Load Relief Section Selection | |
| Load Relief MTBF Calculation | |
| PILC Section Replacement Selection | |
| PILC MTBF Calculation | |
| Reliability Section Replacement Selection | |
| Reliability MTBF Calculation | |
| Summary of changes, costs & benefits | |

CAPT Feeder Section Change Aid
Reliability Section Replacement Selection:
Replace Stop Joints ▼ 50% ▼

Costs:
Sections Changed: 26
Cost/Section: 18000.0
Total: 468000

Targeted stop joint replacement is one of the reliability strategies (3rd Tier)

PILC Cable Runs with Stop Joints 3B92

| Run Id | Worst Stop Joint Rank | Stops in Run | Run Length | Total Stops | Total Sec | Total Stops | Accum % Stops | Accum % Tot Stops |
|---|---|---|---|---|---|---|---|---|
| 10965 | 2 | 3 | 7 | 3 | 7 | 8 | 7 | 2 |

Joint/Sections

| Run_Id | Joint_Id | Joint_Rank | Structure | Leg | Config | Stop | Year |
|---|---|---|---|---|---|---|---|
| 10965 | 7640 | 2 | M3933 | | 3W-1W | S | 1999 |
| 10965 | 7641 | 3 | M3933 | | 2W-1W | N | 1999 |
| 10965 | 7644 | 21 | M3930 | | 4W-1W | S | 1976 |
| 10965 | 7642 | 77 | M3932 | | | N | 1931 |
| 10965 | 7643 | 78 | M3931 | | | N | 1931 |
| 10965 | 7645 | 79 | M3929 | | | N | 1931 |
| 10965 | 7646 | 80 | M3928 | | | N | 1931 |
| 10965 | 7647 | 81 | M3844 | | | N | 1931 |
| 10965 | 7648 | 82 | M3843 | | | S | 2006 |

| | | | | | | |
|---|---|---|---|---|---|---|
| ⊞ 10937 | 4 | 2 | | 5 | 8 | 13 | 3 |
| ⊞ 11005 | 17 | 1 | 1 | 6 | 9 | 15 | 3 |
| ⊞ 10979 | 18 | 2 | 3 | 8 | 12 | 21 | 4 |
| ⊞ 10959 | 30 | 2 | 1 | 10 | 13 | 26 | 5 |
| ⊞ 10939 | 30 | 3 | 2 | 13 | 15 | 33 | 7 |
| ⊞ 10996 | 36 | 2 | 5 | 15 | 16 | 38 | 8 |
| ⊞ 10972 | 40 | 2 | 1 | 17 | 21 | 44 | 9 |
| ⊞ 10993 | 42 | 3 | 5 | 20 | 26 | 51 | 11 |
| ⊞ 10946 | 47 | 2 | 6 | | | | |
| ⊞ 10960 | 67 | 2 | 1 | | | | |
| ⊞ 10963 | 70 | 2 | 1 | | | | |
| ⊞ 10944 | 88 | 2 | 2 | | | | |
| ⊞ 10951 | 103 | 1 | 4 | | | | |
| ⊞ 10984 | 107 | 1 | 1 | | | | |
| ⊞ 10999 | 124 | 2 | 2 | | | | |
| ⊞ 10941 | 132 | 1 | 4 | | | | |
| ⊞ 10975 | 140 | 2 | | | | | |
| ⊞ 10977 | 145 | | | | | | |
| ⊞ 10982 | 163 | 2 | 2 | | | | |
| ⊞ 10987 | 167 | 2 | 4 | | | | |

Download to Excel    Other Feeder Stats 3B92

Prev  Next

Actual MTBF  210    Last OA Date  7/8/2007 1:00:28 AM

CAPITAL ASSET PLANNING SYSTEM

CROSS-REFERENCE TO RELATED APPLICATIONS

This application is a continuation in part of U.S. Nonprovisional patent application Ser. No. 12/791,363, filed on Jun. 1, 2010, and U.S. Nonprovisional patent application Ser. No. 13/479,198, filed on May 23, 2012, which is a continuation of U.S. Nonprovisional patent application Ser. No. 13/274,770 filed Oct. 17, 2011, which claims priority to International Patent Application Serial No. PCT/US2010/036717 filed May 28, 2010, and claims priority to U.S. Provisional Application Ser. No. 61/182,085 filed on May 28, 2009, the contents of all of which are hereby incorporated by reference in their entireties herein.

FIELD

The disclosed subject matter relates to techniques for prioritizing use of capital assets for infrastructure improvements using a capital asset planning tool (CAPT) system.

BACKGROUND

Infrastructures, particularly mature infrastructures, are in constant need of improvement and upgrade. Furthermore, regulatory and environmental concerns dictate the removal of older equipment in favor of newer, more-efficient equipment. Due to commercial realities, there is a limited budget that is available for such improvements to infrastructure. There remains a need to logically and quantitatively determine which assets within a complex infrastructure to select for improvement in order to maximize the benefit obtained therefrom.

SUMMARY

The present application provides methods and systems for prioritizing use of capital assets for infrastructure improvements.

One aspect of the present application provides a capital asset planning system for selecting assets for improvement within an infrastructure that includes one or more data sources descriptive of the infrastructure, one or more databases, coupled to the one or more data sources, to compile the one or more data sources, one or more processors, each coupled to and having respective communication interfaces to receive data from the one or more databases. The processor includes a predictor to generate a first metric of estimated infrastructure effectiveness based, at least in part, on a current status of the infrastructure, a second metric of estimated infrastructure effectiveness based, at least in part, on a user-selected, proposed changed configuration of the infrastructure, and a net metric of infrastructure effectiveness based, at least in part, on said first metric and said second metric. The system also includes a display, coupled to have the one or more processors, for visually presenting the net metric of infrastructure effectiveness, in which the assets for improvement are selected based, at least in part, on the net metric of infrastructure effectiveness.

Another aspect of the present application also provides a method for selecting assets for improvement within an infrastructure that includes accessing one or more data sources descriptive of the infrastructure, compiling the one or more data sources into one or more databases, generating a first metric of estimated infrastructure effectiveness based, at least in part, on a current status of the infrastructure, generating a second metric of estimated infrastructure effectiveness based, at least in part, on a user-selected, proposed changed configuration of the infrastructure, generating a net metric of infrastructure effectiveness based, at least in part, on said first metric and said second metric, and displaying the net metric of infrastructure effectiveness, in which the assets for improvement are selected based, at least in part, on the net metric of infrastructure effectiveness.

BRIEF DESCRIPTION OF THE DRAWINGS

Further objects, features and advantages of the disclosed subject matter will become apparent from the following detailed description taken in conjunction with the accompanying figures showing illustrative embodiments of the disclosed subject matter, in which:

FIG. 1A and FIG. 1B (collectively, FIG. 1) depict an exemplary web application layer (GUI) according to one CAPT embodiment of the presently disclosed subject matter.

FIG. 5A and FIG. 5B (collectively, FIG. 5) depict the Graphical User Interface of a representative embodiment that presents options for Load Relief (Tier 1), PILC Section Replacement (Tier 2), Reliability Replacement (Tier 3) and LPW Selection (Tier 4). All critical component compositions of the feeder are displayed along with their baseline count and user selected new count.

FIG. 6 depicts the CAPT rollup view that lists the minimal costs per largest benefits attainable from replacement of a selectable percentage of bad components in each Tier.

FIG. 11 depicts a screen shot of an exemplary embodiment of the CAPT tool evaluating Tier 1 Load Relief options for a representative feeder.

FIG. 12A and FIG. 12B (collectively, FIG. 12) depict a drilldown into the Tier 1 Load Relief section selection process that displays the runs of overloaded cable sections that are to be selected from for possible replacement.

FIG. 13A and FIG. 13B (collectively, FIG. 13) depict the predicted change in MTBF and Machine Learning susceptibility rank for the feeder if a recommended 55 most at-risk PILC sections from the Tier 2 PILC Replacement evaluation are made.

FIG. 14A and FIG. 14B (collectively, FIG. 14) depict the replacement of 50% of the Stop Joints (total of 11) in a representative feeder during Tier 3 evaluation.

FIG. 16A and FIG. 16B (collectively, FIG. 16) depict the predicted MTBF improvement of 8 days if the changes selected in FIG. 15 are made, i.e., closing 8 open switches and repairing 4 Open Mains.

Figure 2:
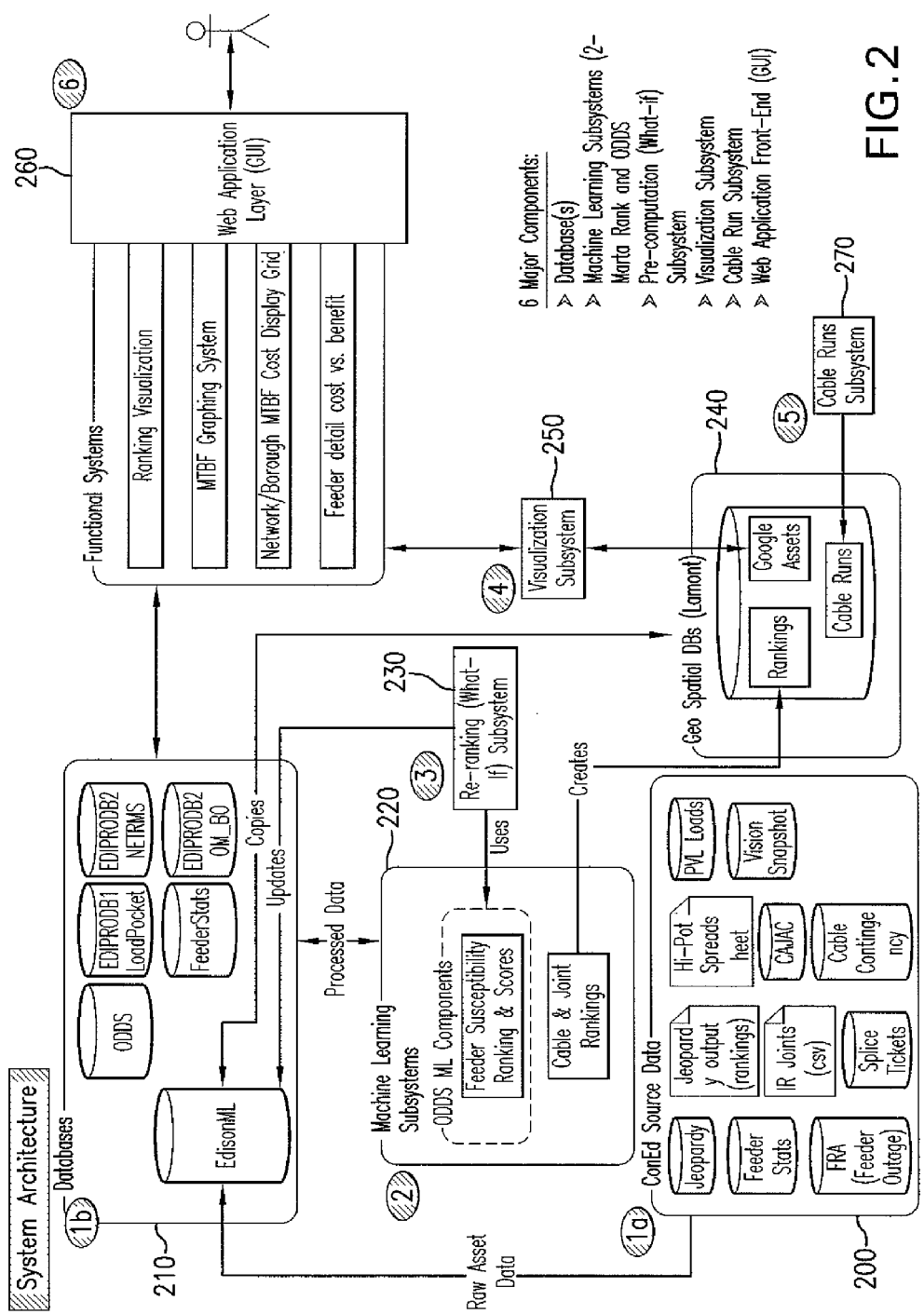
FIG. 2 depicts CAPT system components and their relationship according to an exemplary embodiment of the present application.

While the disclosed subject matter will now be described in detail with reference to the figures, it is done so in connection with illustrative, non-limiting embodiments.

DETAILED DESCRIPTION

One aspect of the present application provides a capital asset planning system for selecting assets for improvement within an infrastructure that includes one or more data sources descriptive of the infrastructure, one or more databases, coupled to the one or more data sources, to compile the one or more data sources, one or more processors, each coupled to and having respective communication interfaces to receive data from the one or more databases. The processor includes a predictor to generate a first metric of estimated infrastructure effectiveness based, at least in part, on a current status of the infrastructure, a second metric of estimated infrastructure effectiveness based, at least in part, on a user-selected, proposed changed configuration of the infrastructure, and a net metric of infrastructure effectiveness based, at least in part, on said first metric and said second metric. The system also includes a display, coupled to have the one or more processors, for visually presenting the net metric of infrastructure effectiveness, in which the assets for improvement are selected based, at least in part, on the net metric of infrastructure effectiveness.

In one embodiment, the first metric of infrastructure effectiveness and the second metric of infrastructure effectiveness are both based, at least in part, on an estimated length of time that the infrastructure produces a commodity, provides a service, or performs a function (hereinafter, reference to an infrastructure producing a commodity can also refer to providing a service or a function). For example, the first metric of infrastructure effectiveness and the second metric of infrastructure effectiveness can be based, at least in part, on the estimated mean time between failure of one or more components of the electrical grid, such as the estimated mean time between failure of an electrical feeder. In other embodiments, the first metric of infrastructure effectiveness and the second metric of infrastructure effectiveness is estimated using a feeder index, the index based, at least in part, on a predicted likelihood of feeder failure. The feeder can be updated in view of changed conditions using machine learning.

In various embodiments, the infrastructure to which the capital asset planning system and methods of the presently disclosed subject matter can be applied to is without limitation. In one embodiment, the infrastructure is selected from the group consisting of a chemical processing operation, a petroleum refining operation, a product manufacturing operation, a telecommunication grid, a transportation infrastructure, a gas network, a commodity pipeline network, and a water treatment network.

In one embodiment, the infrastructure is an electrical grid. Data sources descriptive of the electrical grid include one or more of data representative of at least one of electrical feeder data, electrical cable data, electrical joint data, electrical transformer data, electrical outage data, electrical test pass or fail data, electrical load data, and past capital improvement cost data.

In certain embodiments of the presently disclosed subject matter, the predictor further generates a cost metric based, at least in part, on the cost of the user-selected, proposed change of the infrastructure. For example, the cost metric can be generated based, at least in part, on a user-specified cost of one or more specific actions encompassed by the user-selected, proposed change of the infrastructure. Alternatively, the cost metric is based, at least in part, on past capital improvement cost data. In one embodiment, the predictor further comprises a prioritizer to determine the user-selected, proposed changed configuration of the infrastructure that provides the maximum value based, at least in part, on the net metric of infrastructure effectiveness and the cost metric.

One aspect of the present application also provides a method for selecting assets for improvement within an infrastructure that includes accessing one or more data sources descriptive of the infrastructure, compiling the one or more data sources into one or more databases, generating a first metric of estimated infrastructure effectiveness based, at least in part, on a current status of the infrastructure, generating a second metric of estimated infrastructure effectiveness based, at least in part, on a user-selected, proposed changed configuration of the infrastructure, generating a net metric of infrastructure effectiveness based, at least in part, on said first metric and said second metric, and displaying the net metric of infrastructure effectiveness, in which the assets for improvement are selected based, at least in part, on the net metric of infrastructure effectiveness.

In one embodiment, the infrastructure is an electrical grid, and the first metric, the second metric and the net metric is based, at least in part, on the estimated mean time between failure of an electrical feeder within the electrical grid. Additionally, the first metric of infrastructure effectiveness and the second metric of infrastructure effectiveness can be estimated using a feeder index, the index based, at least in part, on a predicted likelihood of feeder failure. In one embodiment, the method further includes generating a cost metric based on the cost of the user-selected, proposed change of the infrastructure, such that cost vs. benefit analysis can be performed, and the infrastructure receives a maximum "bang for the buck".

In one embodiment, the present application provides methods and systems for quantitatively predicting an effectiveness of a proposed capital improvement project based on establishing the changes in attributes predicting feeder performance based on changes in assets from the improvement project and using either Support Vector Machine (SVM) ranking then regression of ranks to MTBF or SVM Regression to estimate MTBF directly. In one embodiment, the benefit is the change in MTBF from the project and the cost is the cost of the project. The system allows comparison of cost vs. benefits amongst alternative projects given budget constraints providing an enhanced portfolio selection of projects.

As used herein, a "user-selected, proposed changed configuration of the infrastructure," or more generally, a "capital improvement project" or an "improvement" to the infrastructure refers to any change in an infrastructure, including, but not limited to, the replacement of any one or more components of the infrastructure for any purpose, such as to improve the output of the infrastructure, for purposes of preventative maintenance, and/or for regulatory compliance.

The presently disclosed subject matter can be further described with reference to the following non-limiting embodiments. In one particular embodiment, as shown in FIG. 1, the CAPT system is used to analyze how to improve an allocation of a fixed budget devoted to the modernization of cable (i.e., the replacement of older PILC cable, or paper insulated lead cable insulation, to newer XLP cross-linked polyethylene insulation) and EPR (ethylene propylene rubber insulation) cable in a particular electrical distribution feeder (4X52) within an electrical grid.

The CAPT web application can be linked to database(s) that provides baseline feeder attributes (10) regarding, for example, the type of cable currently in place (e.g., paper insulated cable, etc.), connecting joints currently in place, and details regarding the transformers used in a particular feeder to convert power from distribution voltages to consumer voltages. The user can define a variety of proposed upgrades to these attributes (20), based on, for example, a) the percentage of PILC cable that is replaced, i.e., swapped out with more modern cable (e.g., XLP or EPR cable), b) load relief for overstressed cable and/or c) general system reliability and/or preventative maintenance. The CAPT web application layer can also be provided with historical data regarding observed failure and performance for the particular component mix of each individual feeder within a network, circuit, and electrical grid, such as observed MTBF (30), observed OA (Open Automatic feeder failures) counts (40), and actual replacement costs based on the observed performance history of each specific feeder of a network, circuit and electrical grid. Baseline feeder rankings (50), baseline estimated MTBF (60) and estimated FOT (failure on test) prediction data (70) can also be provided, based on the SVM model (either ranking or regression) and optionally, a regression (if SVM ranking is used) prediction that accounts for the particular feeder performance (here, 4X51) before any improvements have been made.

After the user has inputted details regarding the proposed changes, the CAPT system outputs summary data regarding the upgrade work proposed (80), including the estimated cost per section (90) and total cost (100) to perform the proposed work. These cost estimates can be determined based on the historical data for cable replacement efforts that is stored in the database for statistically similar feeders. Alternatively, the cost data can be a user-input field to account for particular features of the particular feeder, or simply a system wide estimate based on for example, previous work or public service commission data.

The CAPT web application, in communication with one or more processors, also outputs new feeder rankings (110), new estimated MTBF (120), and new estimated FOT (130) in view of the upgrades proposed. From these metrics, one can ascertain the statistically estimated (e.g., a SVM model based estimated) benefit of the proposed upgrades in view of the costs, i.e. a cost vs. benefit analysis that determines the best overall "bang for the buck" for the overall portfolio of replacement and preventive maintenance work being planned.

This output can be stored and analyzed vs., for example, predicted MTBF improvements of other proposed changes to determine how to best allocate a fixed budget that is devoted to this type of capital asset and operations and maintenance work. The CAPT system, and the CAPT web application specifically, offers the ability to graphically output this data point along with other data points derived from other proposed changes to other feeders or other possible replacement strategies and levels of replacement in the same feeder in graphical form to assist in budgeting (see FIG. 7).

With reference to FIG. 2, an overview of an exemplary CAPT system architecture is provided. Source data (200) from the infrastructure (e.g., an electrical grid) is tapped, which includes, for example, data regarding the network topology, reliability (e.g., a network reliability index or "Jeopardy" database of most at risk networks and electrical feeders), feeder history and component specifications, outage and previous failure data, information from past capital improvement project costs and benefits, past electric load data, electrical cable component data by section and joint, transformer data, secondary low voltage electrical cable (mains) data, Contingency Analysis, performance variances, and Hi-Pot ranking data (data used to derive a score for deciding which feeders to perform high potential tests in which voltage for a feeder that is over its normal operating voltage is applied to the feeder to stress the feeder and test its reliability).

This data is sent to databases (210) that compile all source data SVM modeling inputs and outputs in order to organize it into a form conducive for further analysis and data mining. Non-limiting databases for use in accordance with the presently disclosed subject matter include the Vision database and the Jeopardy database, which hold cable, joint, and transformer data. The databases also include "ODDS" data, which is a machine learning system that uses SVMs (support vector machines) to predict a ranking (or MTBF using SVM regression) from most likely to least likely feeders susceptible to impending failure. See, e.g., International Published PCT Application No. WO 09/117742, hereby incorporated by reference in its entirety.

Figure 18:
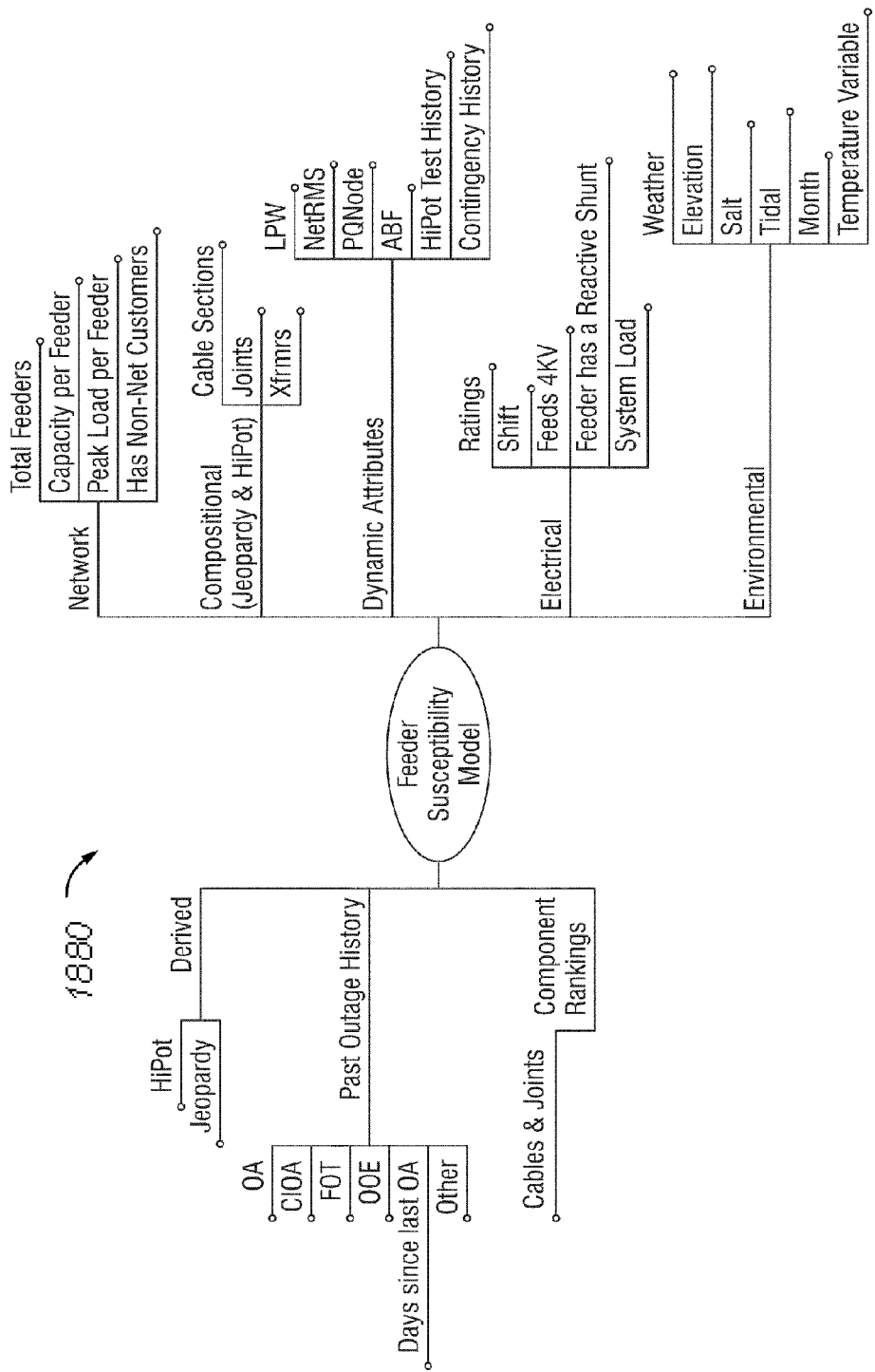
FIG. 18 is a tree diagram illustration of electrical feeder attributes for determining electrical feeder circuit susceptibility that can be implemented within embodiments of the presently disclosed subject matter.

With reference to FIG. 18 exemplary attributes of an electrical feeder circuit that can be implemented within embodiments of the presently disclosed subject matter will now be described for purpose of illustration and not limitation. As shown in FIG. 18, the data retrieved includes attributes 1880 of an electrical feeder circuit which can include at least one of derived information, past outage history, component rankings, network configuration, compositional characteristics, dynamic attributes, electrical characteristics and environmental characteristics. The derived information can be from existing databases. The past outage history can include, for example, feeder outage (OA) information, cut in open auto information (CIOA), failed on test (FOT), of on emergency (OOE), and days since last outage. The component characteristics can include cables and joints information. The network configuration can include information regarding total electrical feeder circuits, capacity (in amps) per feeder circuit, peak load per feeder circuit, and whether the network includes non-network customers. The compositional characteristics can include information regarding cable sections, joints, terminators, and transformers. The dynamic attributes can include, for example, information regarding load pocket weight (LPW), remote monitoring system (NetRMS) data, power quality (PQ) Node data, Alive on Backfeed (ABF) history, history of HiPot Tests which is an electrical potential test for checking the integrity of insulation, and contingency history. The electrical characteristics can include information regarding ratings, shift factors, and system load and the environmental characteristics can include information such as weather, elevation, salt, tidal, month and temperature variable.

Figure 19:
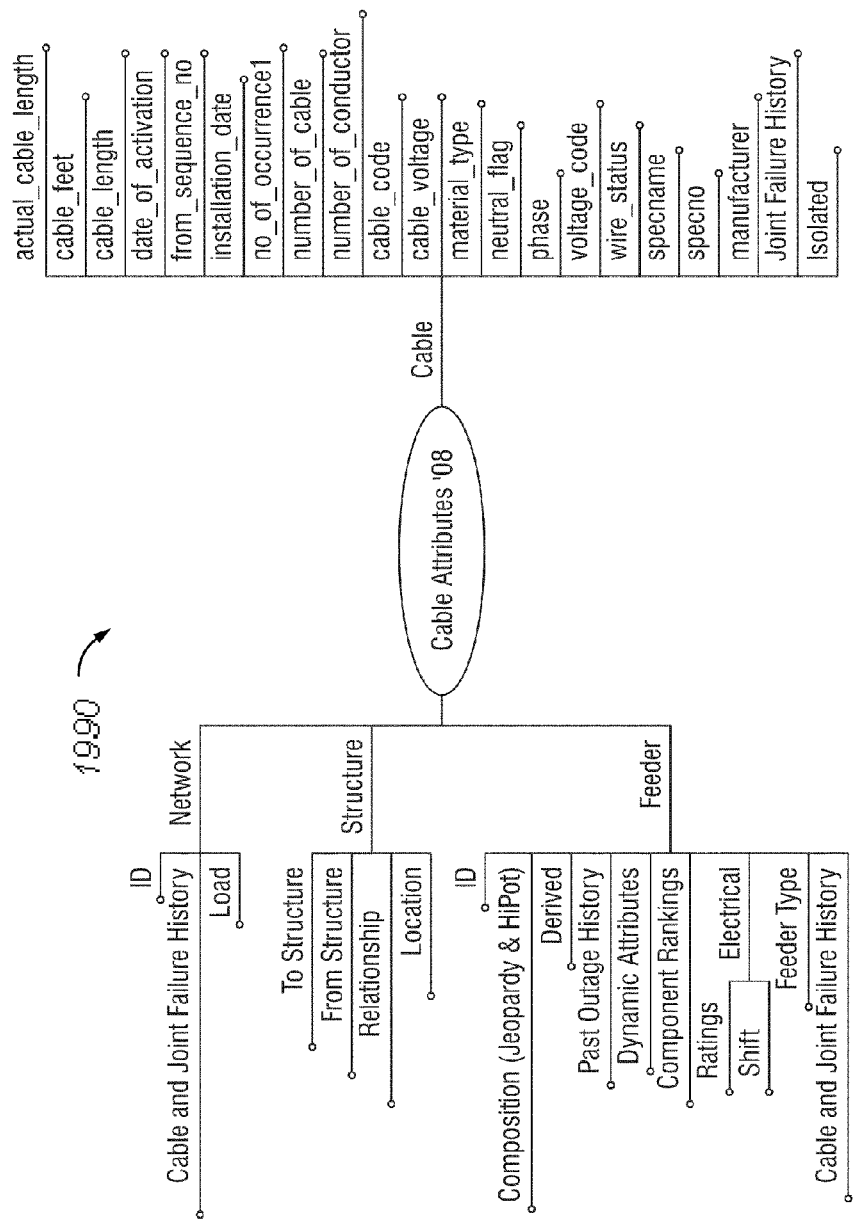
FIG. 19 is a tree diagram illustration cable attributes that can be implemented within embodiments of the presently disclosed subject matter.

With reference to FIG. 19, exemplary component characteristics of an electrical feeder circuit that can be implemented within embodiments of the presently disclosed subject matter will now be described for purpose of illustration and not limitation. As shown in FIG. 19, the component characteristics can include cable attributes 1990 that include at least one of network information, structure information, feeder information and specific cable section information. The network information can include for example, ID information, cable and joint failure history and load information. The structure information can include the structure to and from which the cable is providing service, the relationship between the structures and the location of the structures. The feeder information can include for example, compositional information, derived information (including, e.g., attributes described above in connection with FIG. 18), past outage information, dynamic attributes, electrical information, feeder type, and cable and joint failure history. The cable information can include for example, cable length and type, installation information including date, number of cables, cable voltage information, phase information and manufacturer information.

Figure 20:
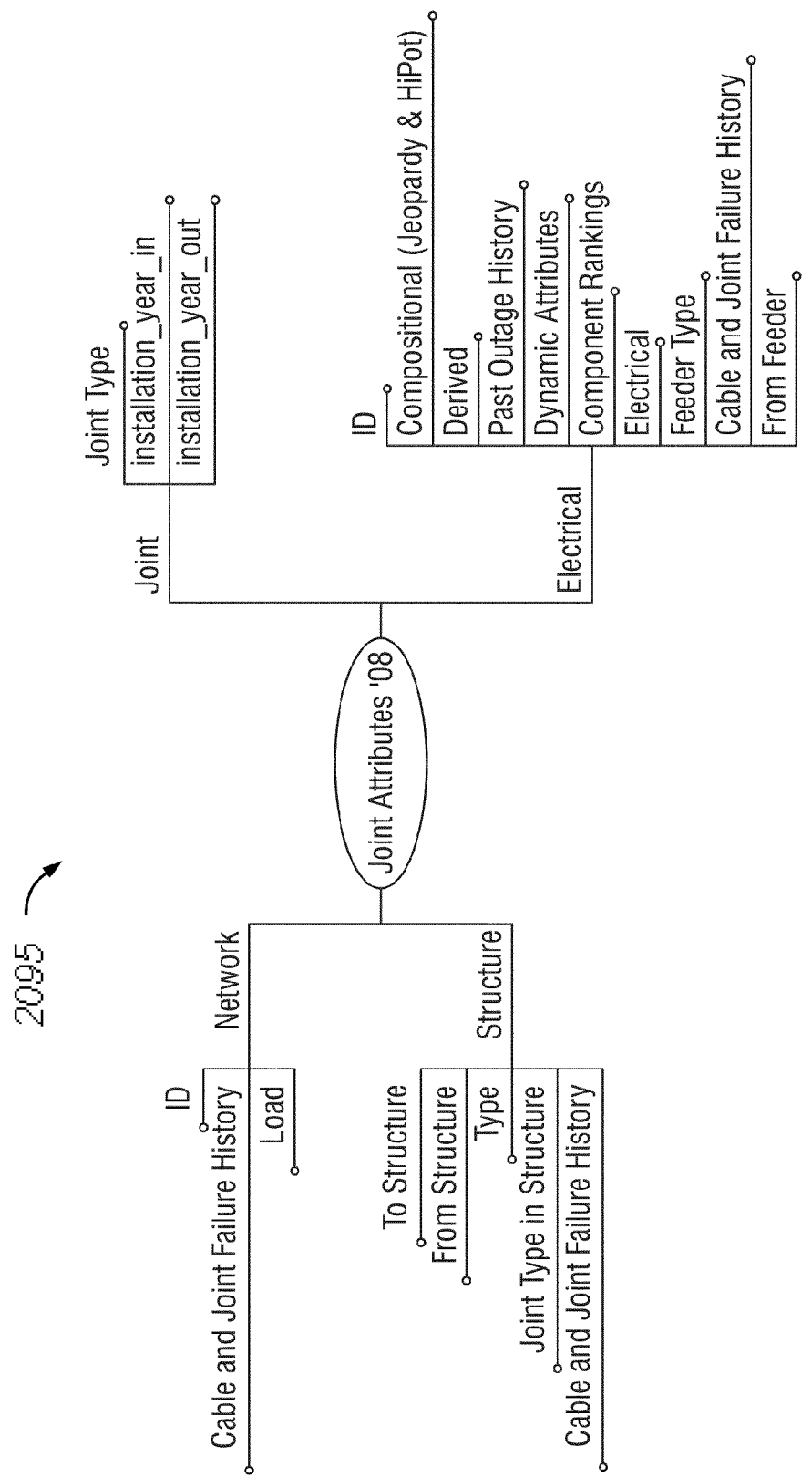
FIG. 20 is a tree diagram illustrating joint attributes that can be implemented within embodiments of the presently disclosed subject matter.

With reference to FIG. 20, exemplary joint attributes 2095 of an electrical feeder circuit that can be implemented within embodiments of the presently disclosed subject matter will now be described for purpose of illustration and not limitation. As shown in FIG. 20, the joint attributes 2095 can include network characteristics, structure characteristics, joint characteristics and feeder characteristics. The network characteristics can include ID information, cable and joint failure history and load information. The structure characteristics can include information regarding the structures to and from which the joint is connected, the type of structure, the joint type within the structure and additional cable and joint failure history information. The joint characteristics can include joint type, installation year 'in' and 'out' information. Further, the feeder characteristics can include ID information, compositional information, derived information, past outage history information, dynamic attribute information, component ranking information, electrical information, feeder type information, additional cable and joint failure history information and from which feeder information.

The databases are also in communication with other machine learning subsystems (220), that process data from the database and determines, for example, cable and joint rankings similar to the feeder rankings discussed above. The machine learning subsystems can be configured to automatically rerank potential capital asset, operations, and maintenance work (230) according to, e.g., the optimal mix of predicted benefits at the minimal costs as more data is continually received over time and changes are enacted on the real system based on the predictions of CAPT outputs (see FIG. 3).

In this example, the databases are also in communication with geospatial databases (240), including mapping data, such as Google Earth mapping data to create a GIS visualization subsystem (250). The geospatial database also receives data from a cable subsystem (270), that processes additional details regarding runs (a contiguous series) of the same type of cable.

The processed data from the database and visualization data from the visualization subsystem are communicated to the CAPT web application layer (GUI) (260), an example of which is provided in FIG. 1. The web application layer can output, among other things, ranking visualizations, MTBF graphing systems, network/borough MTBF vs. cost display grids and feeder cost vs. benefit analysis details, including both tables and charts.

Figure 3:
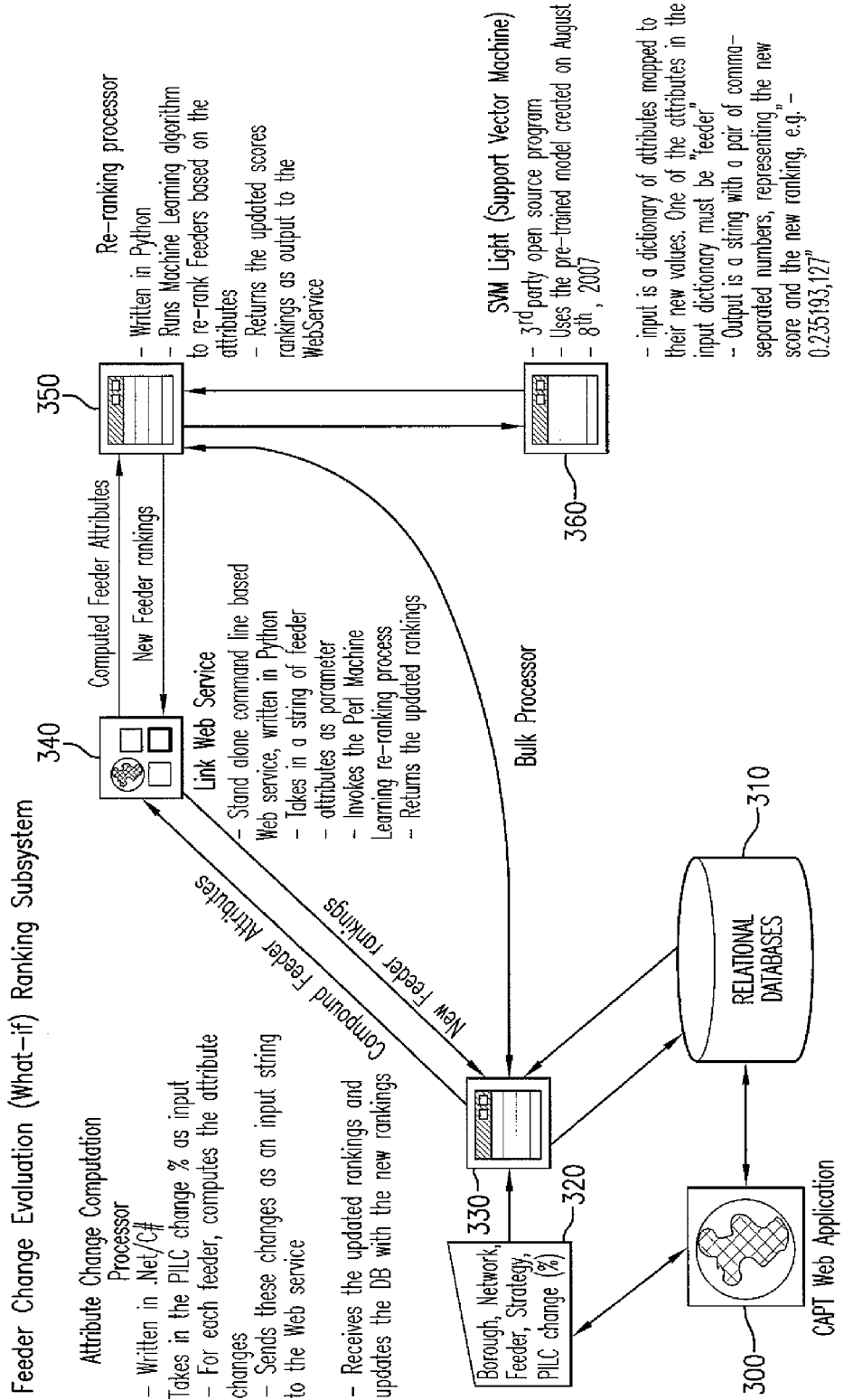
FIG. 3 depicts the Feeder change evaluation ranking system that re-ranks feeders and updates Support Vector Machine scores to evaluate What-If impact from Capital or Operational changes such as those described in Tiers 1-4 according to one embodiment of the presently disclosed subject matter.

Further details regarding feeder re-ranking data are provided in FIG. 3. The CAPT web application (300) is in communication with relational databases (310), examples of which are discussed throughout this patent application, and borough and network feeder parameters, strategies and cable, joint and transformer change options (PILC replacement percentages) (320). As shown in the Figure, the relational database is in communication with one or more of machine learning processors. These processors include an attribute change computation processor (330), which sends to the Link Web service the attributes for a changed feeder and receives updated rankings and updates the database with the new rankings. In this particular, non-limiting embodiment, the attribute change computation processor is written in .net/C#. For each feeder, attribute changes can be computed based on, among other things, changed sections selected by the CAPT interface, and the data is sent as an input string to the linked web service (340).

The linked web service can be a stand alone, command-line based web service that receives a string of feeder attributes as parameters and returns updated rankings and MTBF predictions. In this particular non-limiting embodiment, the link web service is written in Python programming language and invokes the Python-based Machine Learning re-ranking process.

The link web service can also be in communication with a re-ranking processor (350), also written in Python to return updated scores and rankings to the link web service. The re-ranking processor can run a system such as for example, an Outage Derived Data Set (ODDS) system, which can include a SVM and/or other machine learning component to re-rank feeders based on MTBF improvement based on, for example, SVM processing of component attributes. The re-ranking processor can be in communication with the SVM Light processor (360).

As noted previously in connection with FIG. 1, embodiments of the presently disclosed subject maintain an actual baseline performance metric, and a predicted baseline performance metric. Comparison of the predicted performance metric with a predicted baseline performance metric can be preferable to comparing the predicted performance metric to the actually observed baseline performance metric, since it is best to be consistent in using the model to obtain both a baseline and projected changes to system performance. Upon receiving proposed capital, operations, and maintenance improvement funds, the actual vs predicted performance metrics are all updated. Providing the actually observed performance metrics therefore provides the "reality check," in that by comparing the observed baseline performance metric to the predicted baseline performance metric, one can measure the extent to which the model matches the conditions actually observed in the field.

Figure 4:
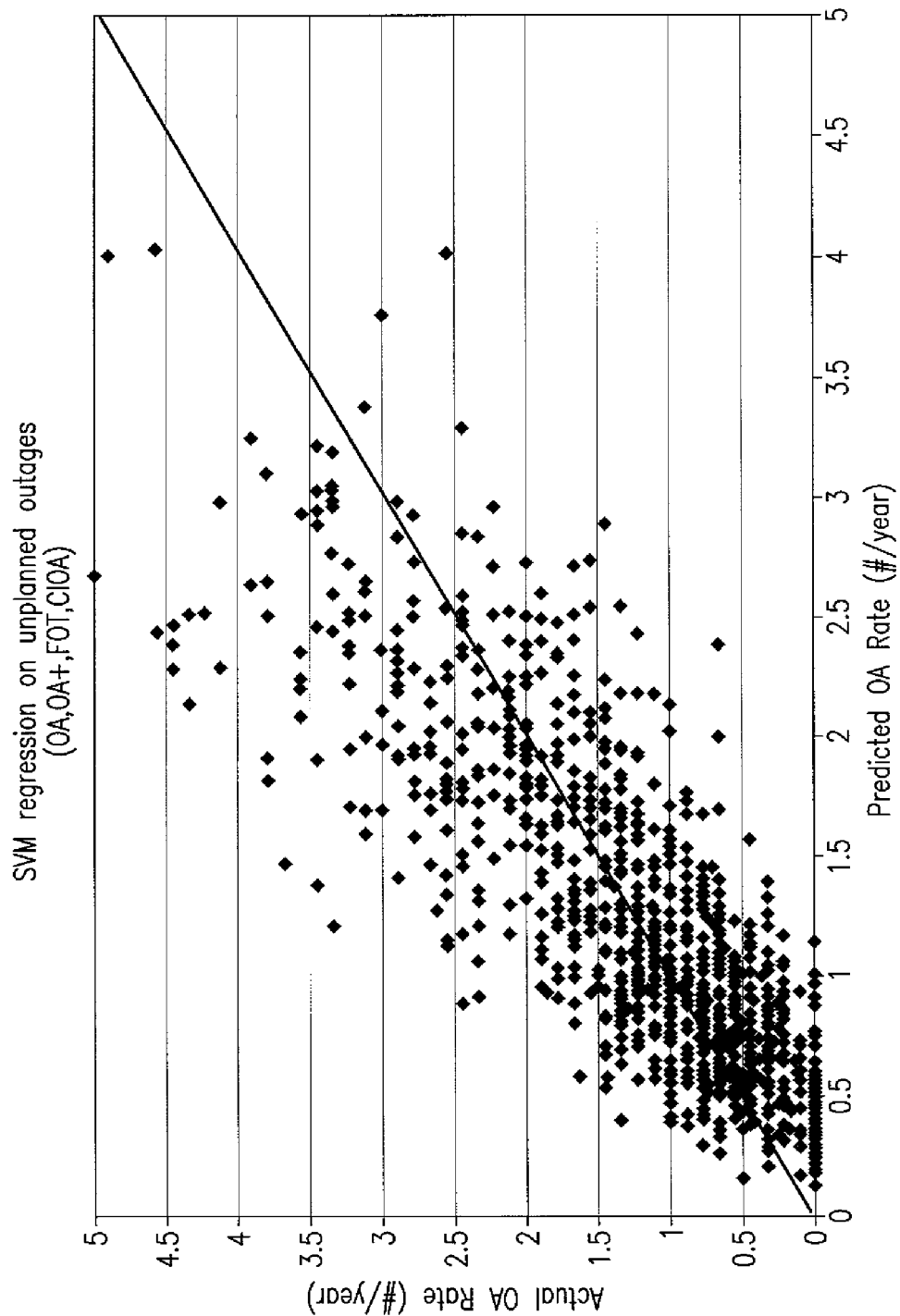
FIG. 4 depicts the goodness-of-fit validation method for establishing that the Predicted OA Feeder Failure Rate (1/MTBF) that is computed from a linear regression of the Machine Learning SVM scores and rankings of FIG. 4 represents a statistically valid representation of the Actual observed OA Feeder Failure Rate (1/MTBF).

FIG. 4 plots the actual OA feeder failure rates versus the predicted OA feeder failure rates for underground feeders within a large and mature electrical grid in the northeast. The predicted OA rate is based on SVM regression. No further regression procedures, besides those associated with the SVM machine learning, need be employed. Alternatively, regression analysis can be performed on top of the SVM machine learning ranks.

A non-limiting embodiment of a CAPT Feeder Section Change Aid is shown in FIG. 5, which allows users to calculate the cost and benefits of changing the mix of user-selected cable sections in view of, for example, Load Relief, PILC Replacement and/or preventative maintenance reliability goals. In this example, the proposed strategy of the capital improvements to the infrastructure is based on the feeder that the user selects (700), and the percentage of PILC cable that is replaced (here 100% or complete removal and replacement of PILC cable) (710). As shown on the right, the CAPT system is provided with mapping functionality (720) to assist the user in selecting the desired feeder sections.

After the user inputs his or her selections from a set of possible strategies, the proposed changes are summarized in terms of the total sections of cable changed, the cost/section and the total cost of proposed upgrade (730). Other feeder statistics (740) are provided, including actual MTBF, OA feeder failure counts, entire outage counts that include scheduled outage work, and historical data regarding overall feeder performance. As shown on the right, charts (750) can plot accumulated OA history over time. Additionally, charts can be available to visualize the cost vs. benefit tradeoffs of different replacement strategies and feeder selections (see FIGS. 8 and 9). Information about cable sections (760), "stop" joints (770) that connect PILC cable section types with XLP and EPR section types, transformers (780), and electric Load (790) on the feeder are also provided. This information is a subset of the attributes used in building the SVM model for predicting the MTBF of the feeder after vs before the contemplated changes are made.

Figure 6:
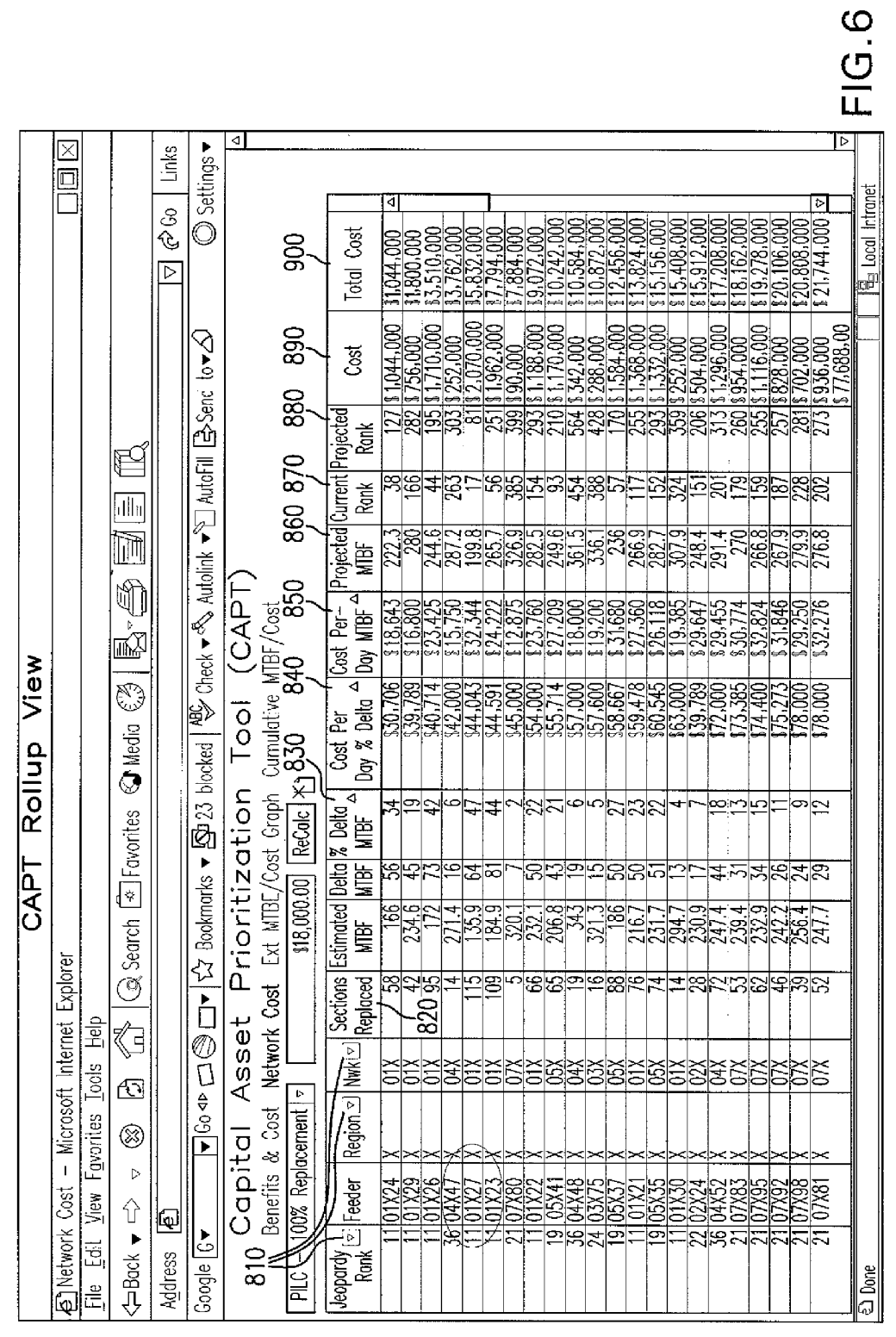

An exemplary output of the CAPT System is provided in FIG. 6, in which cost vs. benefit data from various feeders are compared based on user-defined filters and sorts (810) (e.g. Jeopardy network reliability index, ODDS failure susceptibility index, feeder region). Capital improvement data, such as the number of PILC cable sections replaced (820) is also provided. In addition to estimated MTBF and the delta MTBF between predicted and baseline discussed above, the delta MTBF can be normalized by size or cost, such as a % Delta MTBF (830), and Cost Per Day % Delta (840). In this way a small change in MTBF for a poorly performing feeder with a small baseline MTBF can be established as more valuable than a large change in a good feeder with an already large MTBF because the % Delta MTBF will be higher. Running Cost per feeder (890) and running Total Cost (900) are also provided. In this particular embodiment, cost-per-day MTBF (850), Projected MTBF (860), Current rank before improvement (870) and Projected rank (880) after improvement are also provided.

Figure 7:
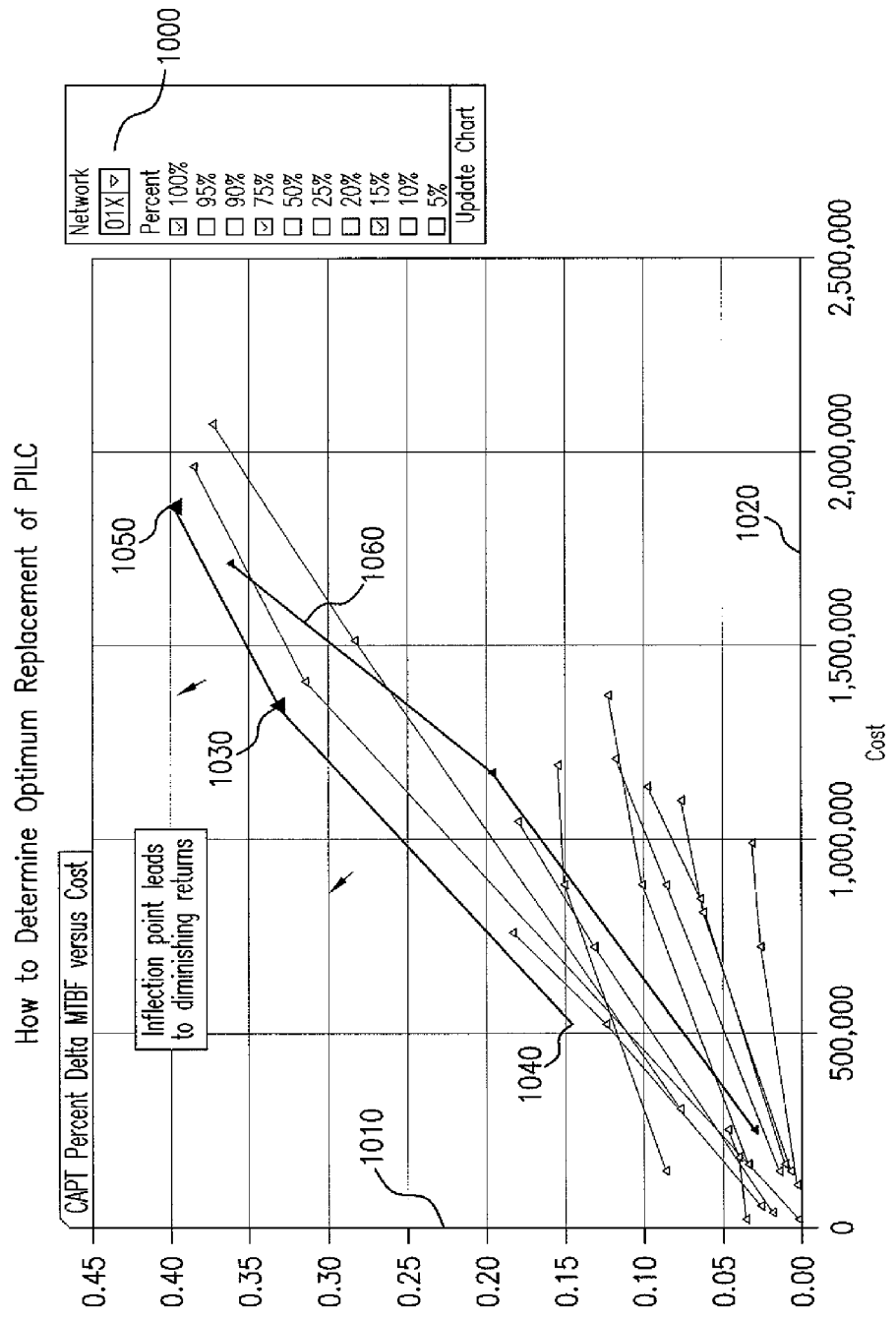
FIG. 7 depicts a crossplot of % Delta MTBF (vertical y-axis) vs estimated costs (horizontal x-axis) used to evaluate which feeders in a given network or circuit provide the maximum benefit for optimal cost.

FIG. 7 demonstrates a cost vs. benefit analysis of proposed capital improvement projects in graphical form, which in turn can be used to determine replacement of PILC cable which provides the most "bang for the buck". In this particular embodiment, one is trying to ascertain the cost vs. benefit of based on: a) 15% replacement of PILC cable in a given feeder; b) 75% replacement of PILC cable, and c) 100% replacement of PILC cable within a large, mature electrical grid in the northeast. The network (1000), and selection order of the PILC cable section replacement can also be specified. For a selected network, 100% PILC cable section replacement, sometimes called feeder "backboning" efforts can be analyzed based on the benefit, i.e., the percent delta MTBF plotted along the y-axis (1010) against the cost of the feeder "backboning" (1020) along the x-axis.

As can be ascertained from the line with the highest slope, one can visualize which capital improvement project obtains maximum "bang for the buck." Inflection points, such as the decrease in marginal MTBF gains shown at (1030) indicate areas of diminishing returns. The highlighted line in FIG. 7 shows the percent delta MTBF for PILC cable replacement for feeder 1X23. The first point (1040) shows "bang for buck" given a 15% replacement, the second (1030) for 75% replacement and the third (1050) for 100% replacement of PILC. The CAPT system informs the user that it would be most effective to replace 75% of the PILC sections in this feeder, and devoting resources that would have been devoted to 100% replacement of PILC sections to more work on other feeders instead. For example, as to feeder 01X26, the CAPT system indicates that 100% replacement of PILC cable sections would provide more "bang for buck" as the slope from 75% to 100% (1060) is much higher.

Figure 8:
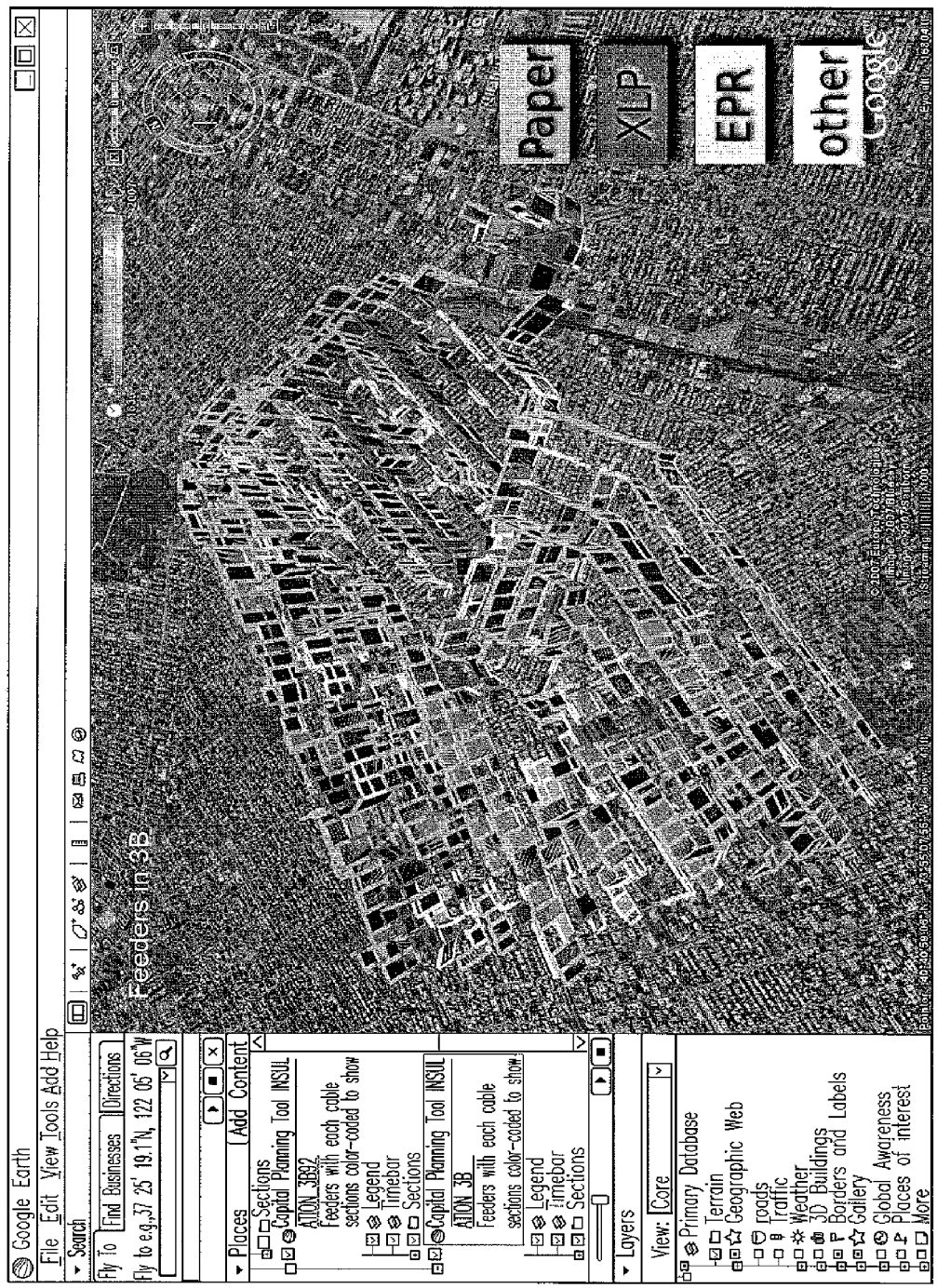
FIG. 8 depicts a Geographic Information System display (Google Earth) of the Machine Learning Ranking of each component section of each feeder in a representative network. The higher the "window pane", the more susceptible each section is to impending failure.
Figure 9:
FIG. 9 depicts a selected feeder from the FIG. 8 network with several candidate runs of PILC cable sections, the replacement of which will lower the risk (and lower the window pane height in the visual).
Figure 10:
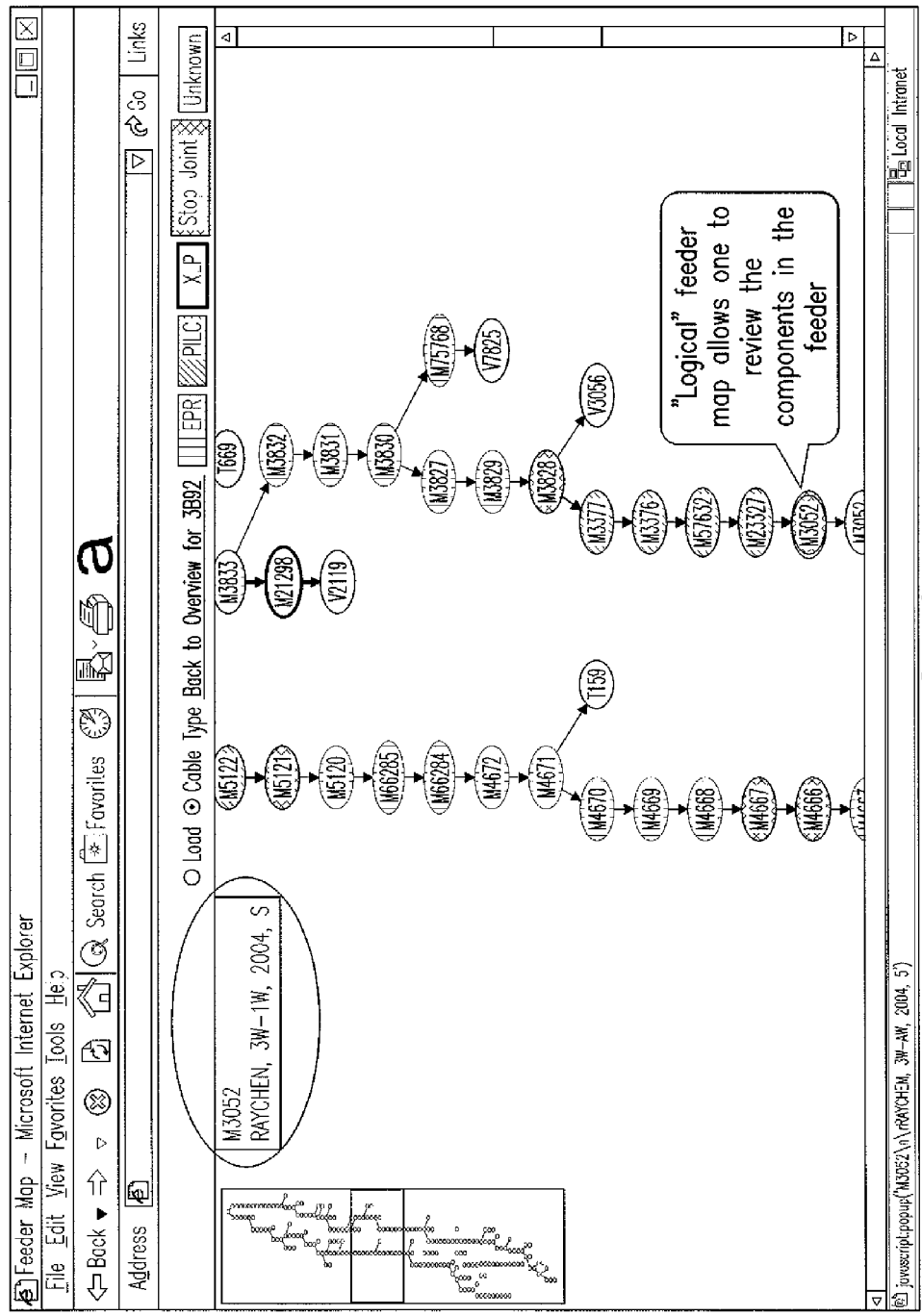
FIG. 10 depicts a zoom into the topological layout of the feeder (upper left, white box) that shows component by component connectivity between feeder sections and the manholes (M) containing the joints connecting the sections. T and V are transformers.

Various embodiments of the CAPT system provide mapping functionality. FIG. 8 is a display of cable sections in a particular network (3B), which can be ranked according to their susceptibility to failure. Higher "window panes" or bars indicate a higher likelihood of failure for each cable section. FIG. 9 is a display of cable sections for a feeder, which can be ranked according to their susceptibility to impending failure. Again, higher panes or bars indicate a higher likelihood of failure. FIG. 10 provides an alternative logical display of feeder components, such as joints, cable sections and manholes and visually displays information on cable type (EPC, PILC or XLP) and if there is a stop joint in the manhole associated with the feeder. In addition it provides a drilldown detail of all the joints associated with the feeder in a manhole via a popup window.

Figure 11:
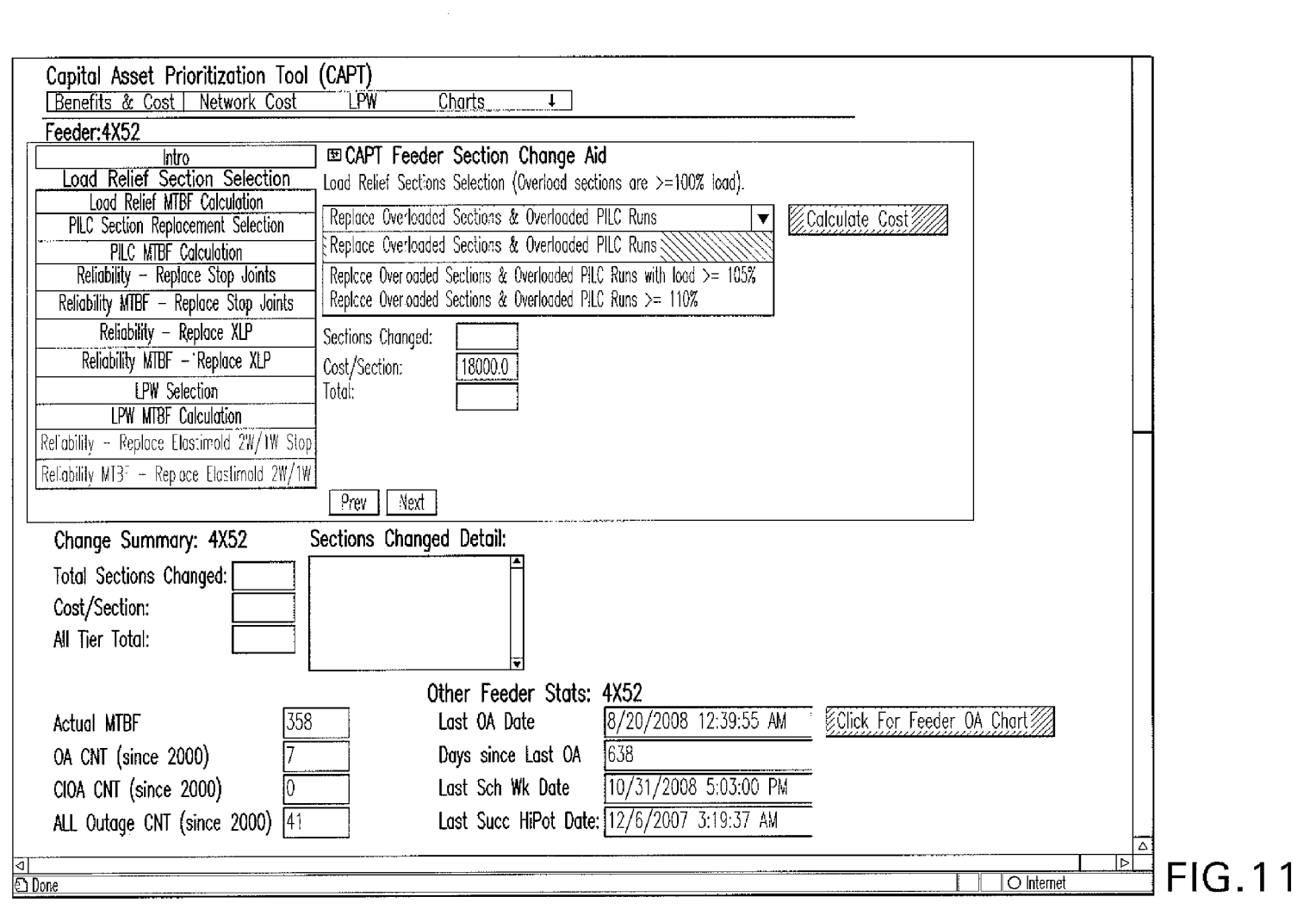

FIG. 11 displays an additional or alternative embodiment of the presently disclosed subject matter, in which the cost vs. benefit of capital improvement projects is determined in view of providing load relief to cable sections and runs of a feeder, as opposed to being in view of replacing PILC cable with more modern cable as in the previous example. A user can select that all overloaded sections and overloaded PILC runs overloaded at more than 100% or rating be replaced, or only those sections and runs that are overloaded by more than 105%, or more than 110% based on the section and run ratings. It is noted that, additionally or alternatively, the proposed capital improvement project can be also described in terms of system reliability, meaning operations and maintenance performance instead of, for example, in terms of capital PILC cable replacement, or in terms of cable and run load.

In an alternative embodiment, a "tiered strategy" can be employed to additively provide a strategy for proposed capital improvement projects. In one example, the first mandate is to replace all overloaded sections (Tier 1), then the mandated yearly replacement of PILC sections (Tier 2)—only a fraction of which is feasible to replace in any one year, and then reliability improvements comprising replacing XLP cable or replacing stop joints, if there is remaining budget (Tier 3). Operationally, Load Pocket Weight (Tier 4) can then be evaluated by comparing cost vs MTBF benefit for closing transformer switches that are currently open, bringing transformer banks that are currently offline back online, repairing cut low voltage cables called Open Mains, and/or repairing SCADA reporting problems. In this example, the CAPT system is careful in that selections of cable sections in Tier 1 are not available for replacement in Tier 2 or Tier 3 actions to avoid double-counting, and that different combinations of Tier 4 work activities can be summed to produce additional operational risk reduction via increased MTBF at times of stress to the electric grid and its feeders (such as peak summer heat days). Also cable section selections chosen in Tier 2 are not available in Tier 3. In addition, reliability actions in each Tier are additive to other actions chosen for every other Tier so that decisions can be made within each Tier and in the overall, combined work plan for the portfolio of all Tiers.

Figure 12B:
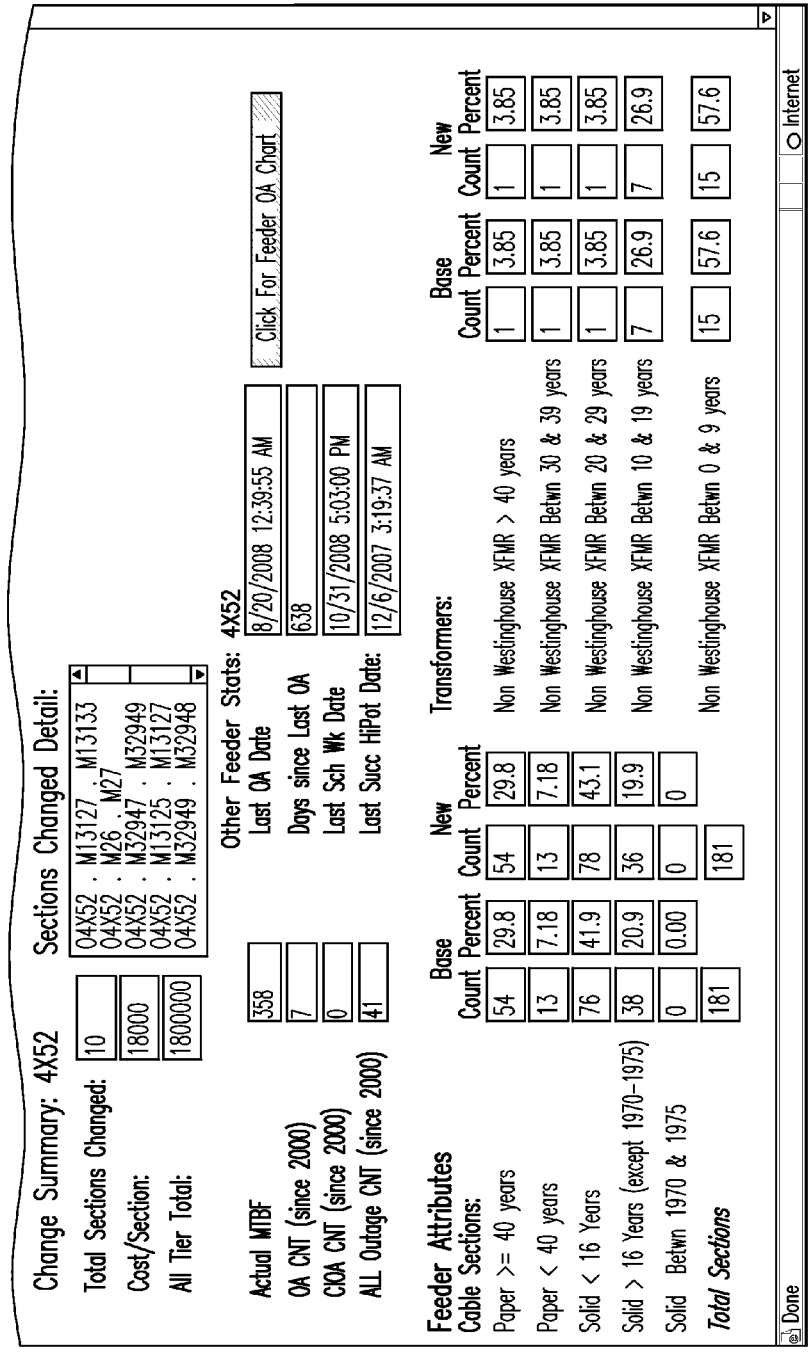

FIG. 12 provides more detail on replacement strategy that is based on the load of the sections (Tier 1 as identified above) and PILC runs (Tier 2 as identified above). For a particular feeder (4X52), in which the user has selected that all overloaded sections and overloaded PILC runs be replaced, the CAPT system displays specifics about the overloaded runs (1500) and overloaded non-PILC sections (1510). Similar to outputs in which capital improvement projects are proposed based on % of PILC cable replacement, the CAPT system details feeder statistics and attributes (e.g., transformer data, cable section data) based on capital improvement projects that are prioritized based on load data.

Figure 13A:
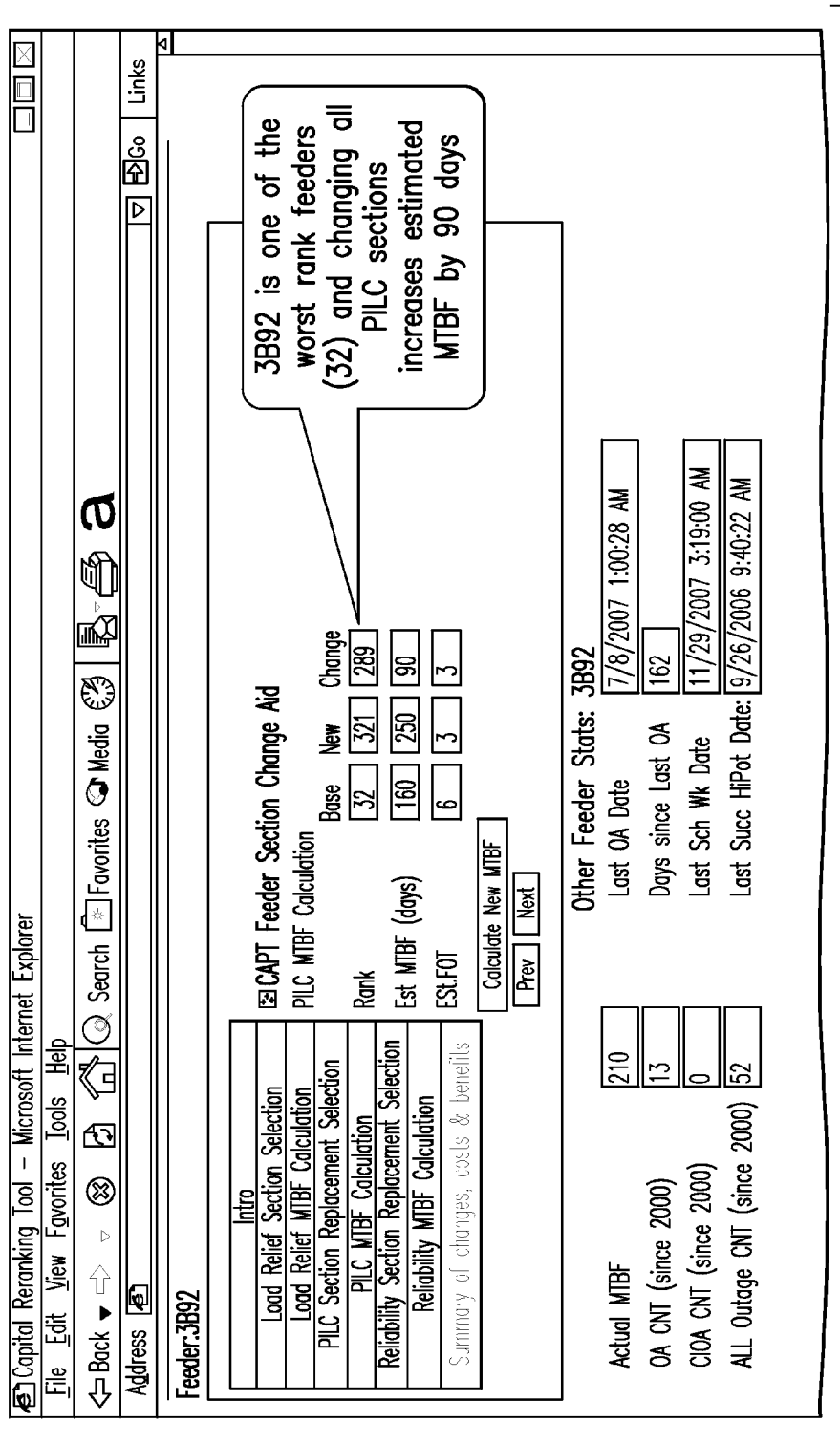

FIG. 13 provides estimated MTBF and delta MTBF data for a capital improvement project that is planned based on the replacement of PILC sections. In this particular example, the number of PILC cable sections is reduced from 55 to 0 in feeder 3B92. This increases the estimated MTBF by 90 days and improves the susceptibility to failure rank of the feeder from 32 to 289.

FIG. 14 provides an example of a proposed capital improvement project that is prioritized based on system reliability. In this example, stop joints are targeted for replacement based on their susceptibility to failure.

Figure 15:
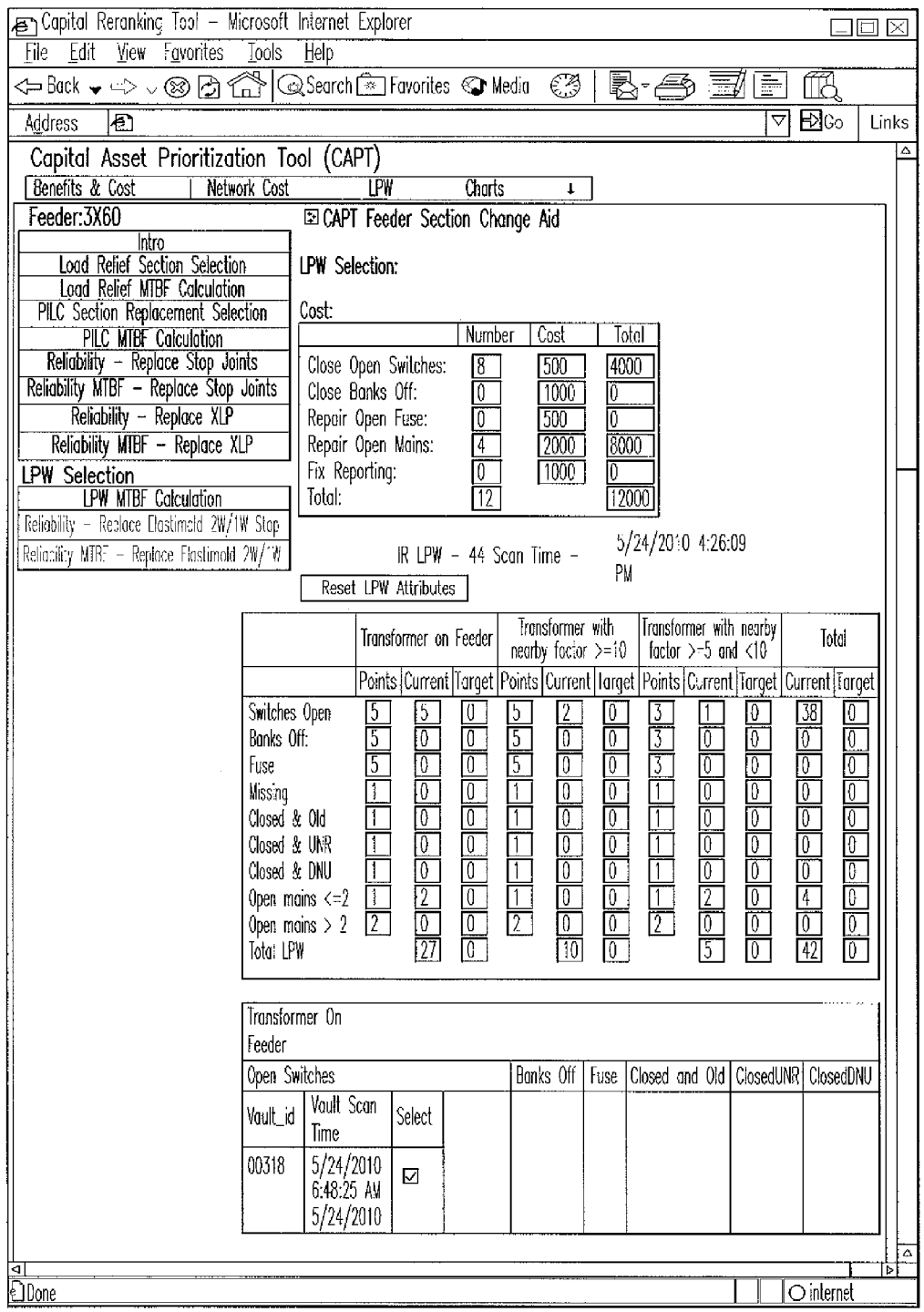
FIG. 15 depicts a screen capture of the CAPT tool Tier 4 evaluation of Load Pocket Weight repairs that are possible for a representative feeder.
Figure 16A:
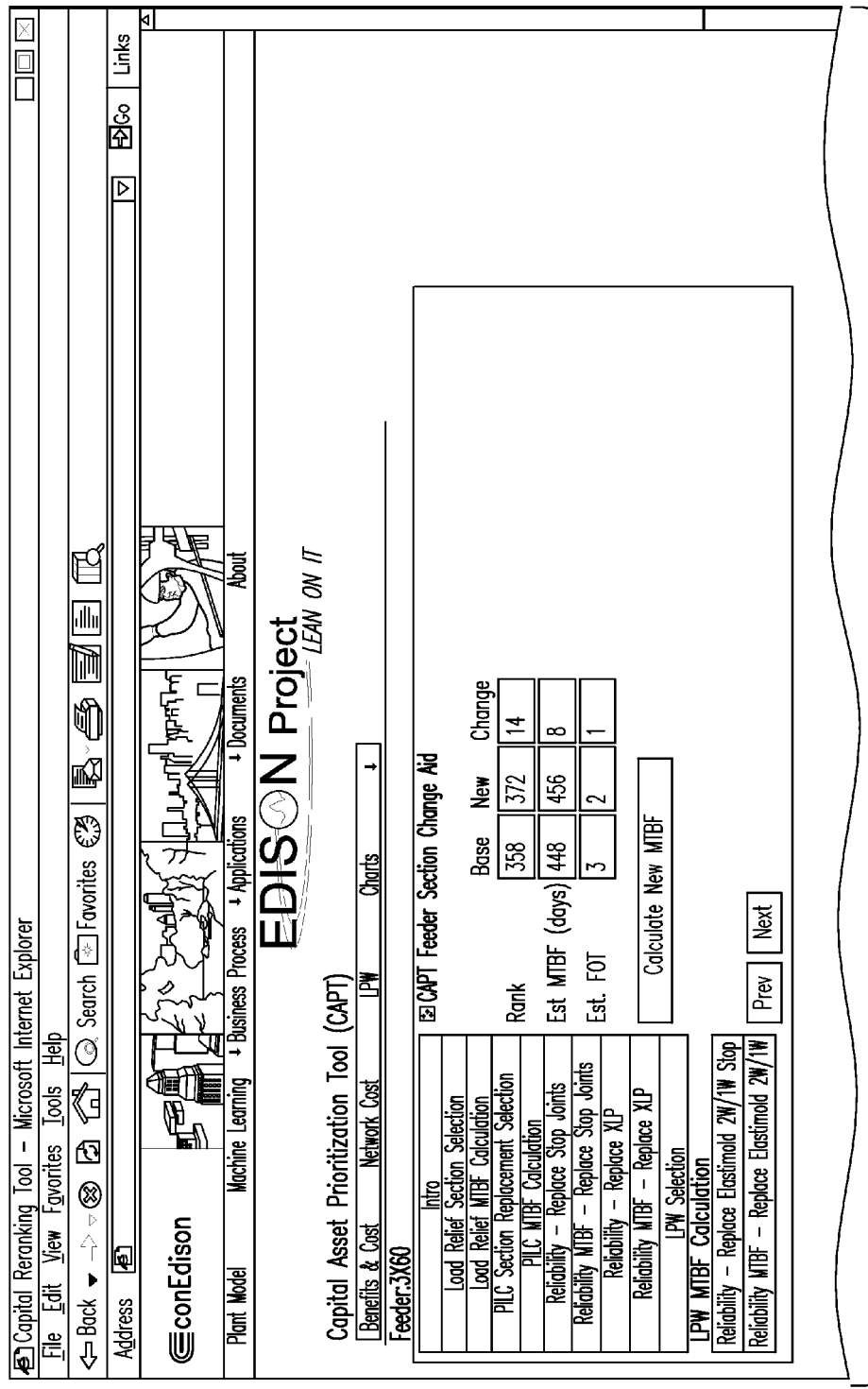
Figure 16B:
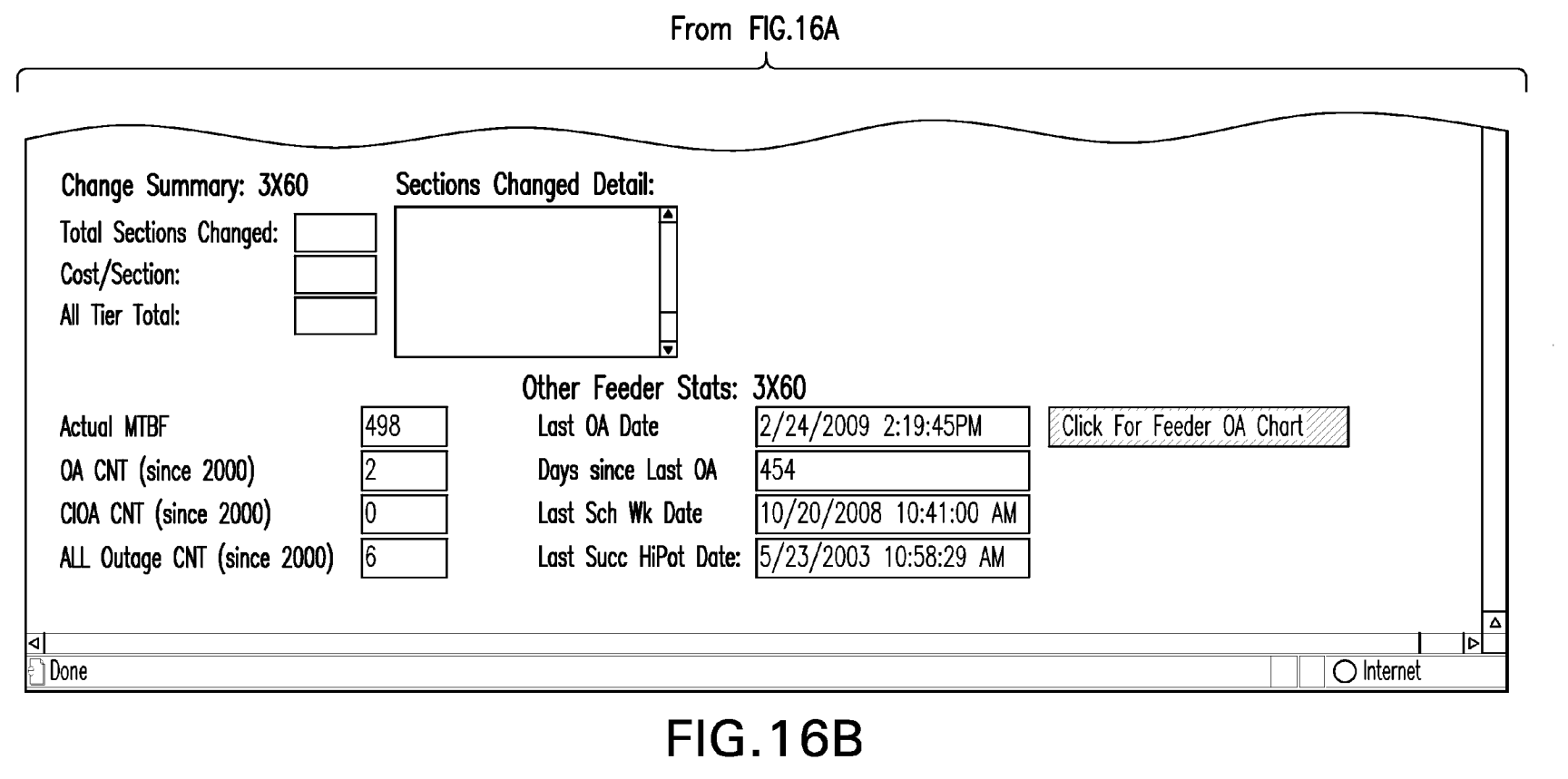

FIG. 15 provides a depiction of an additional alternative embodiment according to the presently disclosed subject matter, in which the attribute "Load Pocket Weight" is used as a basis for formulating a proposed operations and maintenance improvement strategy (Tier 4), and the strategy thus proposed is similarly analyzed to determine maximum "bang for the buck," (e.g., delta MTBF vs. cost). Generally, Load Pocket Weight (LPW) is a metric used to define trouble in transferring load from local geographic load pockets of a feeder to the secondary grid via transformers in the distribution network (thusly the Load Pocket Weight nomenclature). Various indicators of such trouble, like as "open (transformer) network protector switches" "banks off transformers" which are offline for various maintenance reasons, "open fuses" also for transformer protection, "open mains" or secondary cable that is cut, and Supervisory Control And Data Acquisition (SCADA) reporting problems such as "missing", "open" and "old" SCADA readings, etc., are assigned point values and the total used to indicate where Load Pocket problems are via this total weight. The proposed capital, operations and maintenance improvement project is then planned using the CAPT tool based on lowering towards zero the total load pocket weight of a feeder, i.e., actions are proposed like "close open switches," "bring online banks off," "repair open fuses," "repair open mains," and "fix reporting problems" that reduce the LPW towards zero. As shown in FIG. 16, a delta MTBF can be determined based on the ODDS predictions of MTBF improvement from actions taken to reduce the load pocket weight. A decrease in LPW, for example, can increase MTBF.

Additionally or alternatively, the LPW itself can become one of the performance metrics of certain embodiments the CAPT system. For example, certain embodiments of the CAPT system can include a component for manipulating LPW. A user can select individual maintenance actions to the infrastructure, and the projected LPW based on the changes can be compared to the projected LPW based on the current status of the infrastructure.

Figure 17:
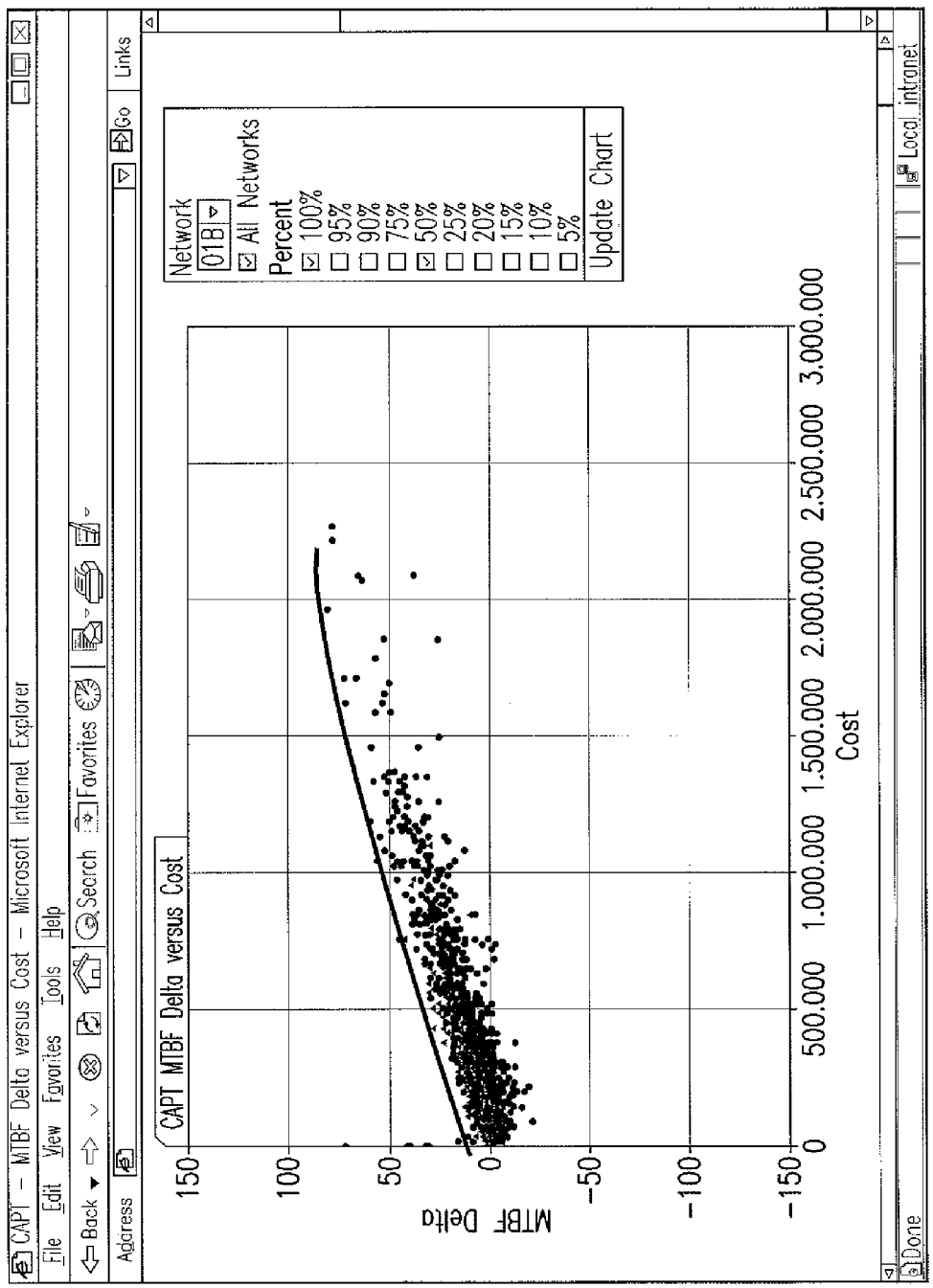
FIG. 17 depicts the Efficient Frontier of cost vs benefit (in MTBF Delta Days) for 50% and 100% PILC cable replacement options from Tier 2 evaluation.

FIG. 17 exemplifies a methodology for determining the capital improvement project with the best "bang for the buck" for multiple feeders in multiple networks, circuits, or electric grids. Data points corresponding to the cost and delta MTBF for replacing, for example, 50% or 100% of the PILC cable sections in the various feeders are provided. The percentage of PILC cable replaced is a user-specified parameter. Excluding outliers, the upper range of the curve, i.e., those points with the highest delta MTBF for a given cost, define an efficient frontier in portfolio management theory and should receive priority given a limited capital improvement budget.

While the CAPT web application is described largely in the context of a capital, operations and maintenance improvement project within an electrical grid (e.g., replacing stop joints and PILC cable sections in electrical feeders), it is important to note that it is equally applicable to a wide range of other capital improvement, operations and preventive maintenance processes, including but not limited to, chemical processing operations, product manufacturing operations, telecommunications, transportation, civil, gas, pipeline, storage, steam, water, sewer, subway, rail, solar, wind, nuclear and other infrastructure projects. So long as there is a quantifiable performance metric associated with the capital, operations and maintenance improvement, and one or more attributes that also affect the performance metric, the CAPT methods of the present application can be used to estimate the costs vs benefits of the improvement project, individually and in totum for the portfolio of the activity.

When a feeder fails, its substation protection circuitry will isolate if from its power supply in the substation automatically, which is know in the art as an "open auto" or "OA." In one embodiment, the CAPT tool can use the number of OA failures of the feeder under investigation for specified time period, termed the Mean Time Between Failures (MTBF). In another embodiment, the CAPT tool can use the number of all outage types that involves a component failure. For example, the attribute value in one embodiment can be the number of OA outages, "fail on test" ("FOT"), and "cut-in open auto" ("CIOA") failures that open upon initial energization after a repair of any kind.

Additional details regarding the machine learning techniques that can be used in accordance with the presently disclosed systems and methods can be found in U.S. Pat. No. 7,395,252, which is hereby incorporated by reference.

It will be understood that the foregoing is only illustrative of the principles of the disclosed subject matter, and that various modifications can be made by those skilled in the art without departing from the scope and spirit thereof.

The invention claimed is:

1. A capital asset planning system for selecting assets for improvement within an infrastructure comprising:
(a) one or more data sources descriptive of the infrastructure;
(b) one or more databases, coupled to the one or more data sources, to compile the one or more data sources;
(c) one or more processors, each coupled to and having respective communication interfaces to receive data from the one or more databases, the one or more processors comprising a predictor to generate:
(i) a first metric of estimated infrastructure effectiveness based, at least in part, on a current status of the infrastructure;
(ii) a second metric of estimated infrastructure effectiveness based, at least in part, on a user-selected, proposed changed configuration of the infrastructure;

(iii) a net metric of infrastructure effectiveness based, at least in part, on said first metric and said second metric; and (iv) at least one cost metric of the proposed changed configuration of the infrastructure, wherein the at least one cost metric of the proposed changed configuration relates to the assets for improvement; and (d) a user interface module, coupled to have the one or more processors configured to:

visually present information comprising:
the net metric of infrastructure effectiveness and
the at least one cost metric of the proposed changed configuration; and enable a user to select the assets for improvement, wherein the assets for improvement are selected based, at least in part, on the net metric of infrastructure effectiveness and the at least one cost metric of the proposed changed configuration.

2. The capital asset planning system of claim 1, wherein the first metric of infrastructure effectiveness and the second metric of infrastructure effectiveness are both based, at least in part, on an estimated length of time that the infrastructure produces a commodity.

3. The capital asset planning system of claim 1, wherein the infrastructure is selected from the group consisting of a chemical processing operation, a petroleum refining operation, a product manufacturing operation, a telecommunication grid, a transportation infrastructure, a gas network, a commodity pipeline network, and a water treatment network.

4. The capital asset planning system of claim 1, wherein the infrastructure is an electrical grid.

5. The capital asset planning system of claim 4, wherein the first metric of infrastructure effectiveness and the second metric of infrastructure effectiveness are based, at least in part, on the estimated mean time between failure of one or more components of the electrical grid.

6. The capital asset planning system of claim 4, wherein the one or more data sources descriptive of the infrastructure include data representative of at least one of electrical feeder data, electrical cable data, electrical joint data, electrical transformer data, electrical outage data, electrical test pass or fail data, electrical load data, and past capital improvement cost data.

7. The capital asset planning system of claim 4, wherein the first metric of infrastructure effectiveness and the second metric of infrastructure effectiveness are estimated using a feeder index, said index based, at least in part, on a predicted likelihood of feeder failure.

8. The capital asset planning system of claim 7, wherein the predicted likelihood of feeder failure is obtained using machine learning.

9. The capital asset planning system of claim 7, wherein the feeder index is recalculated based, at least in part, on observed and previously predicted feeder data.

10. The capital asset planning system of claim 5, wherein the estimated mean time between failure is the estimated mean time between failure of an electrical feeder.

11. The capital asset planning system of claim 1, wherein the at least one cost metric is generated based, at least in part, on a user-specified cost of one or more specific actions encompassed by the user-selected, proposed change of the infrastructure.

12. The capital asset planning system of claim 1, wherein the one or more data sources include past capital improvement cost data, and the at least one cost metric is based, at least in part, on past capital improvement cost data.

13. The capital asset planning system of claim 1, wherein the predictor further comprises a prioritizer to determine the user-selected, proposed changed configuration of the infrastructure that provides the maximum value based, at least in part, on the net metric of infrastructure effectiveness and the cost metric.

14. A method for selecting assets for improvement within an infrastructure comprising:

(a) accessing one or more data sources descriptive of the infrastructure;

(b) compiling the one or more data sources into one or more databases;

(c) generating, via one or more processors, a first metric of estimated infrastructure effectiveness based, at least in part, on a current status of the infrastructure;

(d) generating, via the one or more processors, a second metric of estimated infrastructure effectiveness based, at least in part, on a user-selected, proposed changed configuration of the infrastructure; and (e) generating, via the one or more processors, a net metric of infrastructure effectiveness based, at least in part, on said first metric and said second metric;

(f) generating, via the one or more processors, at least one cost metric of the proposed changed configuration of the infrastructure, wherein the at least one cost metric of the proposed changed configuration relates to the assets for improvement;

(g) displaying, via a user interface module coupled to the one or more processors, the net metric of infrastructure effectiveness the at least one cost metric of the proposed changed configuration; and (h) receiving, via the user interface module coupled to the one or more processors, user-selection indicating the assets for improvement, wherein the assets for improvement are selected based, at least in part, on the net metric of infrastructure effectiveness and the at least one cost metric of the proposed changed configuration.

15. The method for selecting assets for improvement of claim 14 wherein the infrastructure is an electrical grid, and said first metric, said second metric and said net metric is based, at least in part, on the estimated mean time between failure of an electrical feeder within the electrical grid.

16. The method for selecting assets for improvement of claim 14, wherein the first metric of infrastructure effectiveness and the second metric of infrastructure effectiveness is estimated using a feeder index, said index based, at least in part, on a predicted likelihood of feeder failure.

17. The method for selecting assets for improvement of claim 14, further comprising generating a cost metric based on the cost of the user-selected, proposed change of the infrastructure.

18. The method for selecting assets for improvement of claim 14, further comprising determining the user-selected, proposed changed configuration of the infrastructure that provides the maximum value based on the net metric of infrastructure effectiveness and the cost metric.

19. A capital asset planning system for selecting assets for improvement within an electrical grid comprising:

(a) one or more data sources descriptive of the infrastructure selected from electrical feeder data, electrical cable data, electrical joint data, electrical transformer data, electrical outage data, electrical test pass or fail data, electrical load data, and past capital improvement cost data;

(b) one or more databases, coupled to the one or more data sources, to compile the one or more data sources;

(c) one or more processors, each coupled to the one or more databases and having respective communication interfaces to receive data from the one or more databases, the one or more processors comprising a predictor to generate:
  (i) an estimated baseline mean time between failure of an electrical feeder;
  (ii) an estimated projected mean time between failure of an electrical feeder based, at least in part, on a user-selected, proposed changed configuration of the electrical grid; and
  (iii) a net mean time between failure based, at least in part on the estimated baseline mean time between failure and the estimated projected mean time between failure;
  (iii) at least one cost metric of the proposed changed configuration of the infrastructure, wherein the at least one cost metric of the proposed changed configuration relates to the assets for improvement; and
(d) a display, coupled to have the one or more processors, for visually presenting the net metric of infrastructure effectiveness and the at least one cost metric of the proposed changed configuration of the electrical grid, wherein the capital asset planning system provides the ability to select assets for improvement based, at least in part, on the net mean time between failure and the cost metric.

20. The capital asset planning system of claim 1, wherein the user interface module is a graphical user interface.

21. The capital asset planning system of claim 1, wherein the user interface module is further configured to enable the user to adjust one or more parameters.

22. The capital asset planning system of claim 1, wherein the user Interface module is further configured to present one or more suggestions to the user.

23. The capital asset planning system of claim 22, wherein the user interface module is further configured to enable the user to select the one or more suggestions.

24. The capital asset planning system of claim 22, wherein the one or more suggestions is one or more strategies.

25. The capital asset planning system of claim 1, wherein the net metric is normalized.

26. The capital asset planning system of claim 1, wherein the visually present information further comprises one or more of said first metric and said second metric.

* * * * *